United States Patent [19]
Togino et al.

[11] Patent Number: 5,959,780
[45] Date of Patent: Sep. 28, 1999

[54] HEAD-MOUNTED DISPLAY APPARATUS COMPRISING A ROTATIONALLY ASYMMETRIC SURFACE

[75] Inventors: Takayoshi Togino, Koganei; Junko Takahashi, Atsugi, both of Japan

[73] Assignee: Olympus Optical Co., Ltd., Tokyo, Japan

[21] Appl. No.: 08/636,592

[22] Filed: Apr. 23, 1996

[30] Foreign Application Priority Data

Apr. 15, 1996 [JP] Japan ................................. 8-092299
Apr. 15, 1996 [JP] Japan ................................. 8-092300
Apr. 15, 1996 [JP] Japan ................................. 8-092301

[51] Int. Cl.$^6$ ................................................ G02B 27/14
[52] U.S. Cl. ............................ 359/630; 359/633; 359/631
[58] Field of Search ........................... 359/630, 631, 359/632, 633, 636, 637, 638, 639, 640; 345/7, 8

[56] References Cited

U.S. PATENT DOCUMENTS

| | | | |
|---|---|---|---|
| 3,836,931 | 9/1974 | Plummer | 354/155 |
| 4,021,846 | 5/1977 | Roese | 359/465 |
| 4,961,625 | 10/1990 | Wood et al. | 340/705 |
| 5,274,406 | 12/1993 | Tejima | 353/70 |
| 5,325,386 | 6/1994 | Jewell et al. | 372/50 |
| 5,357,369 | 10/1994 | Pilling et al. | 359/462 |
| 5,436,765 | 7/1995 | Togino | 359/631 |
| 5,585,813 | 12/1996 | Howard | 345/8 |
| 5,585,967 | 12/1996 | Monroe | 359/629 |
| 5,596,433 | 1/1997 | Konuma | 359/631 |
| 5,699,194 | 12/1997 | Takahashi | 359/633 |
| 5,701,202 | 12/1997 | Takahashi | 359/631 |
| 5,706,136 | 1/1998 | Okuyama et al. | 359/630 |

FOREIGN PATENT DOCUMENTS 0 687 932  12/1995  European Pat. Off. .

OTHER PUBLICATIONS

Patent Abstracts of Japan vol. 096, No. 004, 30 Apr. 1996 & JP 07 325266 A (Olympus Optical Co Ltd), 12 Dec. 1995.
Droessler J G et al: "Titled Cat Helmet–Mounted Display" Optical Engineering, vol. 29, No. 8, 1 Aug. 1990, pp. 849–854, XP000141198.

*Primary Examiner*—Georgia Epps
*Assistant Examiner*—Ricky Mack
*Attorney, Agent, or Firm*—Pillsbury Madison & Sutro LLP

[57] ABSTRACT

A head-mounted image display apparatus capable of providing an observation image which is clear and has minimal distortion even at a wide field angle. The apparatus has an image display device (6), and an ocular optical system (7) for leading an image formed by the image display device (6) to an observer's eyeball position without forming an intermediate image so that the image can be observed as a virtual image. The ocular optical system (7) has at least one reflecting surface (4) having reflecting action. The at least one reflecting surface (4) has a surface configuration defined by a plane-symmetry three-dimensional surface which has no axis of rotational symmetry in the surface nor out of the surface, and which has only one plane of symmetry.

29 Claims, 16 Drawing Sheets

HEAD-MOUNTED DISPLAY APPARATUS COMPRISING A ROTATIONALLY ASYMMETRIC SURFACE

BACKGROUND OF THE INVENTION

The present invention relates to an image display apparatus and, more particularly, to a head- or face-mounted image display apparatus that can be retained on the observer's head or face.

As an example of conventional head- or face-mounted image display apparatus, an image display apparatus disclosed in Japanese Patent Application Unexamined Publication (KOKAI) No. 3-101709 (1991) is known. FIG. 24(a) shows the entire optical system of the conventional image display apparatus, and FIG. 24(b) shows a part of an ocular optical system used in the image display apparatus. As illustrated in these figures, in the conventional image display apparatus, an image that is displayed by an image display device is transmitted as an aerial image by a relay optical system including a positive lens, and the aerial image is projected into an observer's eyeball as an enlarged image by an ocular optical system formed from a concave reflecting mirror.

U.S. Pat. No. 4,669,810 discloses another type of convention image display apparatus. In this apparatus, as shown in FIG. 25, an image of a CRT is transmitted through a relay optical system to form an intermediate images and the image is projected into an observer's eye by a combination of a reflection holographic element and a combiner having a hologram surface.

Japanese Patent Application Unexamined Publication (KOKAI) No. 62-214782 (1987) discloses another type of conventional image display apparatus. As shown in FIGS. 26(a) and 26(b), the conventional image display apparatus is designed to enable an image of an image display device to be directly observed as an enlarged image through an ocular lens.

U.S. Pat. No. 4,026,641 discloses another type of conventional image display apparatus. In the conventional image display apparatus, as shown in FIG. 27, an image of an image display device is transferred to a curved object surface by an image transfer devices and the image transferred to the object surface is projected in the air by a toric reflector.

U.S. Reissue Pat. No. 27,356 discloses another type of conventional image display apparatus. As shown in FIG. 28, the apparatus is an ocular optical system designed to project an object surface onto an exit pupil by a semitransparent concave mirror and a semitransparent plane mirror.

Other known image display apparatuses include those which are disclosed in U.S. Pat. Nos. 4,322,135 and 4,969,724, European Patent No. 0,583,116A2, and Japanese Patent Application unexamined Publication (KOKAI) No. 7-333551 (1995).

In these conventional techniques, however, a reflecting surface and a transmitting surface, which constitute an optical system are formed by using a spherical surface, a rotationally symmetric aspherical surface, a toric surface, an anamorphic surface, etc. Therefore, it has heretofore been impossible to favorably correct ray aberration and distortion at the same time.

If an image for observation is not favorably corrected for both aberration and distortion, the image is distorted as it is viewed by an observer. If the observation image is distorted such that images viewed pith the user's left and right eyes are not in symmetry with each other, the two images cannot properly be fused into a single image. In the case of displaying a figure or the like, the displayed figure appears to be distorted, making it impossible to correctly recognize the shape of the displayed figure.

SUMMARY OF THE INVENTION

In view of the above-described problems of the conventional techniques, an object of the present invention is to provide a head-mounted image display apparatus capable of providing an observation image which is clear and has minimal distortion even at a wide field angle.

To attain the above-described object, the present invention provides a head-mounted image display apparatus which has an image display device, and an ocular optical system for leading an image formed by the image display device to an observer's eyeball position without forming an intermediate image so that the image can be observed as a virtual image. The ocular optical system has at least one reflecting surface having reflecting action. The at least one reflecting surface has a surface configuration defined by a plane-symmetry free form surface in a three-dimensional space which has no axis of rotational symmetry in the surface nor out of the surface, and which has only one plane of symmetry. (The free form surface in a three-dimensional space will also be referred to as a three-dimensional surface. In general, this is an asymmetrical surface which is also described as having no axis of rotational symmetry in the surface, nor out of the surface.).

Assuming that a Z-axis is taken in a direction of prolongation of a line segment along which an axial principal ray from the center of the image display area of the image display device emanates from the ocular optical system and reaches the center of the observer's eyeball position, and that a Y-axis is taken in a direction perpendicular to the Z-axis in a plane containing a folded line segment along which the axial principal ray is reflected by the reflecting surface, and further that an X-axis is taken in a direction perpendicular to both the Z- and Y-axes, it is desirable for the reflecting surface to satisfy either or both of the following conditions (1) and (2):

$$|\phi x|>0 \quad (1)$$

$$|\phi y|>0 \quad (2)$$

where $\phi x$ is a reflective refracting power of an axial principal ray reflecting region of the reflecting surface in a plane perpendicular to the YZ-planee and $\phi y$ is a reflective refracting power of the axial principal ray reflecting region of the reflecting surface in the YZ-plane.

Further, it is desirable for the plane-symmetry three-dimensional surface to satisfy the following condition (3):

$$|\phi x|>0.005(1/mm) \quad (3)$$

Further, it is desirable that the plane of symmetry of the plane-symmetry three-dimensional surface should lie in either the YZ-plane or a plane parallel to the YZ-plane.

Further, it is desirable that either or both of the reflective refracting power of the axial principal ray reflecting region of the reflecting surface in the YZ-plane and the reflective refracting power in a plane perpendicular to the YZ-plane should be positive.

In addition, the present invention provides a head-mounted image display apparatus which has an image display device, and an ocular optical system for leading an image formed by the image display device to an observer's eyeball position without forming an intermediate image so that the image can be observed as a virtual image. The ocular optical system has at least one reflecting surface of a non-rotationally symmetric surface configuration having no axis of rotational symmetry in the surface, nor out of the surface, Assuming that a Z-axis is taken in a direction of prolongation of a line segment along which an axial principal ray from the center of the image display area of the image display device emanates from the ocular optical system and reaches the center of the observer's eyeball position, and that a Y-axis is taken in a direction perpendicular to the Z-axis in a plane containing a folded line segment along which the axial principal ray is reflected by the reflecting surface, and further that an X-axis is taken in a direction perpendicular to both the Z- and Y-axes, the reflecting surface of the non-rotationally symmetric surface configuration satisfies the following condition:

$$-0.2 < DY_{max4} < 0.2 \quad (4\text{-}1)$$

where $DY_{max4}$ denotes all the values of DY2–DY1, DY2–DY3, DY2–DY4, DY2–DY5, and DY2–DY6 when an effective area is defined for the reflecting surface as being an area formed by intersection of the reflecting surface and six principal rays, which are, with the Y-axis direction defined as a vertical direction, an axial principal ray in the Z-axis direction corresponding to the center of the image fields a principal ray in a field angle direction corresponding to the center of the upper edge of the image field, a principal ray in a field angle direction corresponding to the upper-right corner of the image field, a principal ray in a field angle direction corresponding to the center of the right-hand edge of the image field, a principal ray in a field angle direction corresponding to the lower-right corner of the image field, and a principal ray in a field angle direction corresponding to the center of the lower edge of the image field, and an equation which defines the configuration of the reflecting surface is differentiated in the effective area with respect to the Y-axis, which corresponds to the decentering direction of the reflecting surface, thereby obtaining differential values DY2, DY1, DY4, DY5, DY6, and DY3 at points where the six principal rays strike the reflecting surface, respectively.

In additions the present invention provides a head-mounted image display apparatus which has an image display device, and an ocular optical system for leading an image formed by the image display device to an observer's eyeball position without forming an intermediate image so that the image can be observed as a virtual image. A final reflecting surface of the ocular optical system as viewed in the sequence of backward ray tracing in which light rays are traced from the pupil of the observer's eyeball to the image display device has a non-rotationally symmetric surface configuration having no axis of rotational symmetry in nor out of the surface. Assuming that a Z-axis is taken in a direction of prolongation of a line segment along which an axial principal ray from the center of the image display area of the image display device emanates from the ocular optical system and reaches the center of the observer's eyeball position, and that a Y-axis is taken in a direction perpendicular to the Z-axis in a plane containing a folded line segment along which the axial principal ray is reflected by the reflecting surface, and further that an X-axis is taken in a direction perpendicular to both the Z- and Y-axes, the reflecting surface of the non-rotationally symmetric surface configuration satisfies the following condition:

$$0.55 < D^2XY11 < 4.0 \quad (20\text{-}1)$$

where $D^2XY11$ denotes the value of $D^2X2/D^2Y2$ when an effective area is defined for the reflecting surface as being an area formed by intersection of the reflecting surface and six principal rays, which are, with the Y-axis direction defined as a vertical direction, an axial principal ray in the Z-axis direction corresponding to the center of the image field, a principal ray in a field angle direction corresponding to the center of the upper edge of the image field, a principal ray in a field angle direction corresponding to the upper-right corner of the image fields a principal ray in a field angle direction corresponding to the center of the right-hand edge of the image field, a principal ray in a field angle direction corresponding to the lower-right corner of the image field, and a principal ray in a field angle direction corresponding to the center of the lower edge of the image field, and an equation which defines the configuration of the reflecting surface is differentiated twice in the effective area with respect to the Y-axis, which corresponds to the decentering direction of the surface, thereby obtaining second-order differential values $D^2Y2$, $D^2Y1$, $D^2Y4$, $D^2Y5$, $D^2Y6$, and $D^2Y3$ at points where the six principal rays strike the surface, respectively, and further the equation is differentiated twice with respect to the X-axis, which corresponds to a direction perpendicular to the decentering direction, thereby obtaining second-order differential values $D^2X2$, $D^2X1$, $D^2X4$, $D^2X5$, $D^2X6$, and $D^2X3$ at the points where the six principal rays strike the surface, respectively.

In addition, the present invention provides a head-mounted image display apparatus which has an image display device, and an ocular optical system for leading an image formed by the image display device to an observer's eyeball position without forming an intermediate image so that the image can be observed as a virtual image. A reflecting surface of the ocular optical system other than a final reflecting surface of the ocular optical system as viewed in the sequence of backward ray tracing in which light rays are traced from the pupil of the observer's eyeball to the image display device has a non-rotationally symmetric surface configuration having no axis of rotational symmetry in the surface, nor out of the surface. Assuming that a Z-axis is taken in a direction of prolongation of a line segment along which an axial principal ray from the center of the image display area of the image display device emanates from the ocular optical system and reaches the center of the observer's eyeball position, and that a Y-axis is taken in a direction perpendicular to the Z-axis in a plane containing a folded line segment along which the axial principal ray is reflected by the reflecting surface, and further that an X-axis is taken in a direction perpendicular to both the Z- and Y-axes, the reflecting surface of the non-rotationally symmetric surface configuration satisfies the following condition:

$$0.55 < D^2XY12 < 5 \quad (21\text{-}1)$$

where $D^2XY12$ denotes the value of $D^2X2/D^2Y2$ when an effective area is defined for the reflecting surface as being an area formed by intersection of the reflecting surface and six principal rays, which are, with the Y-axis direction defined as a vertical direction, an axial principal ray in the Z-axis direction corresponding to the center of the image field, a principal ray in a field angle direction corresponding to the center of the upper edge of the image field, a principal ray in a field angle direction corresponding to the upper-right corner of the image field, a principal ray in a field angle direction corresponding to the center of the right-hand edge of the image field, a principal ray in a field angle direction corresponding to the lower-right corner of the image field, and a principal ray in a field angle direction corresponding to the center of the lower edge of the image field, and an equation which defines the configuration of the reflecting surface is differentiated twice in the effective area with respect to the Y-axis, which corresponds to the decentering direction of the surfaces thereby obtaining second-order differential values $D^2Y2$, $D^2Y1$, $D^2Y4$, $D^2Y5$, $D^2Y6$, and $D^2Y3$ at points where the six principal rays strike the surface, respectively, and further the equation is differentiated twice with respect to the X-axis, which corresponds to a direction perpendicular to the decentering direction, thereby obtaining second-order differential values $D^2X2$, $D^2X1$, $D^2X4$, $D^2X5$, $D^2X6$, and $D^2X3$ at the points where the six principal rays strike the surface, respectively.

In addition, the present invention provides a head-mounted image display apparatus which has an image display device, and an ocular optical system for leading an image formed by the image display device to an observer's eyeball position without forming an intermediate image so that the image can be observed as a virtual image. The ocular optical systemoptical system includes at least one reflecting surface of a non-rotationally symmetric surface configuration having no axis of rotational symmetry in the surface, nor out of the surface. Assuming that a Z-axis is taken in a direction of prolongation of a line segment along which an axial principal ray from the center of the image display area of the image display device emanates from the ocular optical system and reaches the center of the observer's eyeball position, and that a Y-axis is taken in a direction perpendicular to the Z-axis in a plane containing a folded line segment along which the axial principal ray is reflected by the reflecting surface, and further that an X-axis is taken in a direction perpendicular to both the Z- and Y-axes, a reflecting surface having the strongest reflective refracting power among those which constitute the ocular optical system satisfies the following condition:

$$-0.015 < CX_{n2}M < 0.1 (1/mm) \quad (25\text{-}1)$$

where $CX_{n2}M$ denotes CXn−CX2 (n is 1, 3 to 6) when an effective area is defined for the reflecting surface as being an area formed by intersection of the reflecting surface and six principal rays, which are with the Y-axis direction defined as a vertical direction, an axial principal ray in the Z-axis direction corresponding to the center of the image field, a principal ray in a field angle direction corresponding to the center of the upper edge of the image field, a principal ray in a field angle direction corresponding to the upper-right corner of the image field, a principal ray in a field angle direction corresponding to the center of the right-hand edge of the image field, a principal ray in a field angle direction corresponding to the lower-right corner of the image field, and a principal ray in a field angle direction corresponding to the center of the lower edge of the image field, and curvatures in the X-axis direction, which corresponds to a direction perpendicular to the decentering direction of the reflecting surface, are determined at points in the effective area at which the six principal rays strike the reflecting surface from an equation which defines the configuration of the reflecting surface as being CX2, CX1, CX4, CX5, CX6 and CX3, respectively.

In addition, the present invention provides a head-mounted image display apparatus which has an image display device, and an ocular optical system for leading an image formed by the image display device to an observer's eyeball position without forming an intermediate image so that the image can be observed as a virtual image. The ocular optical system includes at least one reflecting surface of a non-rotationally symmetric surface configuration having no axis of rotational symmetry in the surface, nor out of the surface. Assuming that a Z-axis is taken in a direction of prolongation of a line segment along which an axial principal ray from the center of the image display area of the image display device emanates from the ocular optical system and reaches the center of the observer's eyeball position, and that a Y-axis is taken in a direction perpendicular to the Z-axis in a plane containing a folded line segment along which the axial principal ray is reflected by the reflecting surface, and further that an X-axis is taken in a direction perpendicular to both the Z- and Y-axes, a reflecting surface having the strongest reflective refracting power among those which constitute the ocular optical system satisfies the following condition:

$$-0.015 < CY_{n2}M < 0.1 (1/mm) \quad (27\text{-}1)$$

where $CY_{n2}M$ denotes CYn−CY2 (n is 1, 3 to 6) when an effective area is defined for the reflecting surface as being an area formed by intersection of the reflecting surface and six principal rays, which are, with the Y-axis direction defined as a vertical direction, an axial principal ray in the Z-axis direction corresponding to the center of the image field, a principal ray in a field angle direction corresponding to the center of the upper edge of the image field, a principal ray in a field angle direction corresponding to the upper-right corner of the image field, a principal ray in a field angle direction corresponding to the center of the right-hand edge of the image field, a principal ray in a field angle direction corresponding to the lower-right corner of the image field, and a principal ray in a field angle direction corresponding to the center of the lower edge of the image field, and curvatures in the Y-axis directions which corresponds to the decentering direction of the reflecting surface, are determined at points in the effective area at which the six principal rays strike the reflecting surface from an equation which defines the configuration of the reflecting surface as being CY2, CY1, CY4, CY5, CY6 and CY3, respectively.

In addition, the present invention provides a head-mounted image display apparatus which has an image display device, and an ocular optical system for leading an image formed by the image display device to an observer's eyeball position without forming an intermediate image so that the image can be observed as a virtual image. The ocular optical system includes at least one reflecting surface having reflecting action. The at least one reflecting surface has a surface configuration defined by a plane-symmetry three-dimensional surface which has no axis of rotational symmetry in the surface, nor out of the surface, and which has only one plane of symmetry. Assuming that a Z-axis is taken in a direction of prolongation of a line segment along which an axial principal ray from the center of the image display area of the image display device emanates from the ocular optical system and reaches the center of the observer's eyeball position, and that a Y-axis is taken in a direction perpendicular to the Z-axis in a plane containing a folded line segment along which the axial principal ray is reflected by the reflecting surface, and further that an X-axis is taken in a direction perpendicular to both the Z- and Y-axes, a reflecting surface having the strongest reflective refracting power among those which constitute the ocular optical system satisfies the following condition:

$$CXYM < 40 \quad (29\text{-}1)$$

where CXYM denotes |CXn|/|CYn| (n is 1 to 6).

In addition, the present invention provides a head-mounted image display apparatus which has an image display device, and an ocular optical system for leading an image formed by the image display device to an observer's eyeball position without forming an intermediate image so that the image can be observed as a virtual image. The ocular optical system includes at least one reflecting surface having reflecting action. The at least one reflecting surface has a surface configuration defined by a plane-symmetry three-dimensional surface which has no axis of rotational symmetry in the surface, nor out of the surface, and which has only one plane of symmetry. Assuming that a Z-axis is taken in a direction of prolongation of a line segment along which an axial principal ray from the center of the image display area of the image display device emanates from the ocular optical system and reaches the center of the observer's eyeball position, and that a Y-axis is taken in a direction perpendicular to the Z-axis in a plane containing a folded line segment along which the axial principal ray is reflected by the reflecting surface, and further that an X-axis is taken in a direction perpendicular to both the Z- and Y-axes, all reflecting surfaces that constitute the ocular optical system satisfy the following condition:

$$CXYA < 40 \quad (28\text{-}1)$$

where CXYA denotes $|CXn|/|CYn|$ (n is 1 to 6).

The reasons why the present invention adopts the above-described arrangements, particularly, the arrangement in which a plane-symmetry three-dimensional surface is used in an ocular optical system of a head-mounted image display apparatus, together the functions thereof, will be explained below.

For the convenience of explanation, first, typical ocular optical systems which may be used in a head-mounted image display apparatus according to the present invention will be illustrated with FIGS. 15 to 22.

In FIG. 15, an ocular optical system 7 comprises a first surface 3, a second surface 4, and a third surface 5. A bundle of light rays emitted from an image display device 6 enters the ocular optical system 7 while being refracted by the third surface 5. Then, the ray bundle is internally reflected by the first surface 3 and reflected by the second surface 4. Then, the ray bundle is incident on the first surface 3 again and refracted by it so as to be projected into an observer's eyeball with the observer's iris position or eyeball rolling center as an exit pupil 1.

In FIG. 16, an ocular optical system 7 comprises a first surface 3, a second surface 4, a third surface 5, and a fourth surface 9. A bundle of light rays emitted from an image display device 6 enters the ocular optical system 7 while being refracted by the third surface 5. Then, the ray bundle is internally reflected by the fourth surface 9 and further internally reflected by the second surface 4. Then, the ray bundle is incident on and refracted by the first surface 3 so as to be projected into an observer's eyeball with the observer's iris position or eyeball rolling center as an exit pupil 1.

In FIG. 17, an ocular optical system 7 comprises a first surface 3, a second surface 4, a third surface 5, and a fourth surface 9. A bundle of light rays emitted from an image display device 6 enters the ocular optical system 7 while being refracted by the third surface 5. Then, the ray bundle is internally reflected by the fourth surface 9 and internally reflected by the third surface 5. Then, the ray bundle is internally reflected by the second surface 4 and refracted by the first surface 3 so as to be projected into an observer's eyeball with the observer's iris position or eyeball rolling center as an exit pupil 1.

In FIG. 18, an ocular optical system 7 comprises a first surface 3, a second surface 4, a third surface 5, and a fourth surface 9. A bundle of light rays emitted from an image display device 6 enters the ocular optical system 7 while being refracted by the third surface 5. Then, the ray bundle is internally reflected by the second surface 4 and further internally reflected by the fourth surface 9. Then, the ray bundle is incident on the second surface 4 again and internally reflected by it. Then, the ray bundle is incident on and refracted by the first surface 3 so as to be projected into an observer's eyeball with the observer's iris position or eyeball rolling center as an exit pupil 1.

In FIG. 19, an ocular optical system 7 comprises a first surface 3, a second surface 4, a third surface 5, and a fourth surface 9. A bundle of light rays emitted from an image display device 6 enters the ocular optical system 7 while being refracted by the second surface 4. Then, the ray bundle is internally reflected by the third surface 5 and further internally reflected by the second surface 4. Then, the ray bundle is internally reflected by the fourth surface 9 and incident on the second surface 4 again and internally reflected by it. Then, the ray bundle is incident on and refracted by the first surface 3 so as to be projected into an observer's eyeball with the observer's iris position or eyeball rolling center as an exit pupil 1.

In FIG. 20, a bundle of light rays emitted from an image display device 6 enters the ocular optical system 7 while being refracted by the third surface 5. Then, the ray bundle is internally reflected by the first surface 3 and further internally reflected by the third surface 5. Then, the ray bundle is internally reflected by the first surface 3 and further reflected by the second surface 4 to be incident on the first surface 3 once again. Then, the ray bundle is refracted by the first surface 3 so as to be projected into an observer's eyeball with the observer's iris position or eyeball rolling center as an exit pupil 1.

In FIG. 21, a bundle of light rays emitted from an image display device 6 enters the ocular optical system 7 while being refracted by the first surface 3. Then, the ray bundle is internally reflected by the third surface 5 and further internally reflected by the first surface 3. Then, the ray bundle is internally reflected by the third surface 5 again and internally reflected by the first surface 3 once again. Then, the ray bundle is reflected by the second surface 4 so as to be incident on the first surface 3 once again. Then, the ray bundle is refracted by the first surface 3 so as to be projected into an observer's eyeball with the observer's iris position or eyeball rolling center as an exit pupil 1.

In FIG. 22, an ocular optical system 7 comprises a first surface 3, a second surface 4, and a third surface 5. A bundle of light rays emitted from an image display device 6 enters the ocular optical system 7 while being refracted by the third surface 5. Then, the ray bundle is internally reflected by the second surface 4 and further internally reflected by the first surface 3. Then, the ray bundle is reflected by the second surface 4 again and incident on the first surface 3 again. Then, the ray bundle is refracted by the first surface 3 so as to be projected into an observer's eyeball with the observer's iris position or eyeball rolling center as an exit pupil 1.

Thus, in the present inventions the surface number of the ocular optical system are, in principle, given as ordinal numbers in backward ray tracing from the exit pupil 1 to the image display device 6. Typically, the present invention will be described on the assumption that it is applied to the ocular optical system 7 shown in FIG. 15. It should, however, be noted that the present invention is not necessarily limited to the optical system shown in FIG. 15, but may also be applied to the optical systems shown in FIGS. 16 to 22, and to other known optical systems.

Next, a coordinate system used in the following description will be explained. As shown in FIG. 15, a visual axis 2 is defined by a straight line along which an axial principal ray that emanates from the center of the exit pupil 1 to reach the center of the image display device 6, as an image display device for forming an image to be observed, travels until it intersects the first surface 3 of the ocular optical system 7. The visual axis 2 is defined as the Z-axis. An axis which perpendicularly intersects the Z-axis and which lies in a plane of decentration of each surface constituting the ocular optical system 7 is defined as the Y-axis. An axis which perpendicularly intersects both the visual axis 2 and the Y-axis is defined as the X-axis.

The following explanation will be made on the basis of backward ray tracing in which light rays are traced from the pupil 1 toward the image display device 6 for forming an image to be observed, unless otherwise specified.

In general, aspherical surfaces are used in order to effect favorable aberration correction with a minimal number of surfaces. Spherical lens systems generally adopt an arrangement in which aberrations produced by a spherical surface, such as spherical aberration, coma, field curvature, etc., are corrected by another surface. In order to reduce various aberrations which would be produced by a spherical surface, an aspherical surface is used. The purpose of using an aspherical surface is to reduce various aberrations which would be produced by one surface and to minimize the number of surfaces used to effect aberration correction, thereby minimizing the number of surfaces constituting the whole optical system.

However, an optical system which is decentered as in the case of an ocular optical system used in a head-mounted image display apparatus according to the present invention suffers from aberrations due to decentration which cannot be corrected by a conventionally employed rotationally symmetric aspherical surface. Aberrations due to decentration include coma, astigmatism, image distortions field curvature, etc. There are conventional examples in which a toric surface, an anamorphic surface, etc. are used to correct such aberrations. However, there has heretofore been proposed no device which is designed with great importance placed on the correction of astigmatism caused by decentration, and which is compact and provides a wide field angle, and further which is satisfactorily corrected for aberrations including image distortion.

Let us introduce aberration correction techniques proposed so far

It is stated in detail in Japanese Patent Application No. 5-264828 (1993), filed by the present applicant, that a combination of a concave mirror and a convex mirror exhibits favorable effect in correction of field curvature. Correction of aberration that is produced by a tilted concave mirror is described, for example, in Japanese Patent Application No. 6-127453 (1994).

Correction of astigmatism that is produced by a tilted concave mirror is described in Japanese Patent Application No. 6-211067 (1994), filed by the present applicant, and also in Japanese Patent Application No. 6-256676 (1994).

Correction of trapezoidal and bow-shaped image distortions which are produced by a tilted concave mirror is described in Japanese Patent Application Unexamined Publication (KOKAI) No. 5-303056 (1993).

However, it has heretofore been impossible to correct these aberrations simultaneously and favorably by using a toric surface, an anamorphic surface, a rotationally symmetric aspherical surface, or a spherical surface.

The present invention is characterized by using a plane-symmetry three-dimensional surface which has no axis of rotational symmetry in the surface, nor out of the surface, and which has only one plane of symmetry to correct the above-described aberrations simultaneously and favorably.

The term "three-dimensional surface" as used in the present invention means a surface which is defined by the following equation:

$$\begin{aligned}
Z = &\ C_2 \\
&+ C_3 y + C_4 x \\
&+ C_5 y^2 + C_6 yx + C_7 x^2 + \\
&+ C_8 y^3 + C_9 y^2 x + C_{10} yx^2 + C_{11} x^3 \\
&+ C_{12} y^4 + C_{13} y^3 x + C_{14} y^2 x^2 + C_{15} yx^3 + C_{16} x^4 \\
&+ C_{17} y^5 + C_{18} y^4 x + C_{19} y^3 x^2 + C_{20} y^2 x^3 + C_{21} yx^4 + C_{22} x^5 \\
&+ C_{23} y^6 + C_{24} y^5 x + C_{25} y^4 x^2 + C_{26} y^3 x^3 + C_{27} y^2 x^4 + C_{28} yx^5 + C_{29} x^6 \\
&+ C_{30} y^7 + C_{31} y^6 x + C_{32} y^5 x^2 + C_{33} y^4 x^3 + C_{34} y^3 x^4 + C_{35} y^2 x^5 + C_{36} yx^6 + C_{37} x^7 \\
&\ldots
\end{aligned} \tag{a}$$

By using such a three-dimensional surface as at least one reflecting surface having reflecting action, a tilted reflecting surface, e.g. the second surface in Examples (described later), can be given a desired tilt in the direction Y at a desired position on the X-axis in the above-described coordinate system, in which: the direction of decentration is defined as the Y-axis; the direction of the observer's visual axis is defined as the Z-axis; and an axis that perpendicularly intersects both the Y- and Z-axes is defined as the X-axis. By doing so, it is possible to correct image distortions which are produced by a decentered concave mirror, particularly an image distortion which occurs in the Y-axis direction, varying according to the image height in the X-axis direction. Consequently, it becomes possible to favorably correct an image distortion in which the horizontal line is observed as being a bow-shaped line.

Next, a trapezoidal distortion which is produced by a decentered concave mirror will be explained. Let us explain the image distortion by backward ray tracing from the observer's eyeball. Light rays emanating from the eyeball divergently in the X-axis direction are reflected by the second surface, which is decentered. At this time, light rays striking the second surface in the positive direction of the Y-axis and light rays striking the second surface in the negative direction of the Y-axis are reflected by the second surface after a considerable difference has been produced between these light rays in terms of divergence in the X-axis direction due to the difference in optical path length between them. Consequently, an image to be observed is formed with a difference in size between an image lying in the positive direction of the Y-axis and an image in the negative direction of the Y-axis. As a results the observation image has a trapezoidal distortion.

This distortion can be corrected by using a three-dimensional surface according to the present invention. The reason for this is because, as will be clear from the defining equation (a), the three-dimensional surface has Y terms of odd-numbered order and X terms of even-numbered order, which enable the curvature to be varied in the X-axis direction as desired according to the sign (positive or negative) of the Y-axis.

Next, a rotationally symmetric image distortion will be explained. For example, in an optical system which has a pupil lying away from a second surface, which is a concave surface, and which provides a wide field angle as in the ocular optical system according to the present invention, a rotationally symmetric pincushion distortion occurs to a considerable extent in backward ray tracing from the pupil plane side. The occurrence of such an image distortion can be suppressed by increasing the tilt of the peripheral portions of the reflecting surface.

Next, a rotationally asymmetric field curvature produced by a decentered concave mirror will be explained. Let us explain the field curvature by backward ray tracing from the observer's eyeball. Light rays emanating from the eyeball divergently in the X-axis direction are reflected by the decentered second surface. The distance to the image surface (i.e. the image display device) from a point on which a light ray impinges is a half of the curvature at the portion on which the light ray impinges. That is, the light rays form an image surface which is tilted with respect to the direction of travel of light rays having been reflected from the decentered concave mirror. Using a three-dimensional surface according to the present invention makes it possible to give desired curvatures in the X- and Y-axis directions at any point relative to the positive and negative directions of the Y-axis. This is because, as will be clear from the defining equation (a), the three-dimensional surface has Y terms of odd-numbered order which enable the curvature to be varied as desired according to the sign (positive or negative) of the Y-axis. This is effective in correcting a rotationally asymmetric field curvature, particularly the tilt of the image surface, produced by a decentered concave mirror.

Next, a rotationally symmetric field curvature will be explained. In general, a reflecting mirror produces a curvature of field along the reflecting surface. Ocular optical systems according to the present invention are generally arranged such that the field curvature can be corrected by a convex mirror which pairs with a concave mirror as described above. However, the field curvature cannot be completely corrected because the number of surfaces is small. It is preferable in order to correct the field curvature left uncorrected to use a three-dimensional surface according to the present invention, which enables a desired curvature to be given at any position.

Astigmatism can be corrected by appropriately changing the difference between the second-order differential or curvature in the X-axis direction and the second-order differential or curvature in the Y-axis direction.

Coma can be corrected by giving a desired tilt in the direction Y at any point on the X-axis on the basis of the same idea as that for a bow-shaped image distortion described above.

In view of producing the of optical parts, it is even more desirable to minimize the number of three-dimensional surfaces used. Accordingly, it is preferable to use the above-described three-dimensional surface as one reflecting surface among at least three surfaces, e.g. the second surface, and a plane surface or a spherical surface or a decentered rotationally symmetric surface as each of the remaining surfaces. By doing so, it is possible to improve productivity.

The second surface, which is a reflecting surface facing the exit pupil of the ocular optical system, has a strong reflective refracting power in comparison to the other surfaces. Therefore, the three-dimensional surface is effectively used as the second surface when it is desired to suppress the occurrence of aberration.

It is possible to suppress the occurrence of comatic aberration by using the three-dimensional surface as the first surface, which serves as both a refracting surface facing the exit pupil of the ocular optical system and a reflecting surface. This is because the first surface is tilted to a considerable extent with respect to the axial principal ray when it acts as a reflecting surface.

By using the three-dimensional surface as the third surface, image distortion can be corrected. The reason for this is that the third surface is disposed close to the image formation position and therefore enables image distortion to be favorably corrected without aggravating other aberrations.

By using two three-dimensional surfaces for two of the at least three surfaces, various aberrations can be corrected even more effectively. If the second and third surfaces are three-dimensional surfaces, for example, a plane surface can be used as the first surface, and it is possible to improve the productivity of the optical elements of the ocular optical system. The first surface can also be formed by using a spherical surface or a rotationally symmetric aspherical surface.

In the present invention, the above-described three-dimensional surface is used as at least one reflecting surface having reflecting action, and the surface configuration of the reflecting surface is defined as a plane-symmetry three-dimensional surface which has no axis of rotational symmetry in the surface nor out of the surface, and which has only one plane of symmetry. More specifically, when a coordinate system is set as shown for example in FIG. 15, the reflecting surface is formed as a three-dimensional surface having a plane of symmetry lying in the YZ-plane, which is a plane containing the direction of decentration of the decentered surface. By doing so, the image formed on the image-formation plane in the backward ray tracing can be made symmetric with respect to the YZ-plane as a plane of symmetry. Thus, the cost for aberration correction can be reduced to a considerable extent.

It should be noted that the term "reflecting surface having reflecting action" as used in the present invention includes any reflecting surface having reflective action, e.g. a totally reflecting surface, a mirror-coated surface, a semitransparent reflecting surface, etc.

When a plane-symmetry three-dimensional surface which has only one plane of symmetry is used as at least one reflecting surface of an ocular optical system as described above, it is possible to provide an ocular optical system having a wide field angle and favorably corrected for aberrations by satisfying the following conditions.

Firsts when X-, Y- and Z-axes are determined according to the above definition, six principal rays among those which emanate from the center of the pupil position and enter the image display device are determined by combinations of field angles in the directions X and Y, i.e. the field angle zero in the direction X, the maximum field angle in the direction X, the maximum field angle in the direction +Y, the field angle zero in the direction Y, and the maximum field angle in the direction −Y, as shown in Table 1 below:

TABLE 1

|  | Field angle zero in direction X | Maximum field angle in direction X |
|---|---|---|
| Maximum field angle in direction +Y | ① | ④ |
| Field angle zero in direction Y | ② | ⑤ |
| Maximum field angle in direction −Y | ③ | ⑥ |

As shown in Table 1: an axial principal ray in a visual axis direction corresponding to the center of the image field is defined as $\hat{2}$; a principal ray in a field angle direction corresponding to the center of the upper edge of the image field is defined as $\hat{1}$; a principal ray in a field angle direction corresponding to the upper-right corner of the image field is defined as $\hat{4}$; a principal ray in a field angle direction corresponding to the center of the right-hand edge of the image field is defined as $\hat{5}$; a principal ray in a field angle direction corresponding to the lower-right corner of the image field is defined as $\hat{6}$; and a principal ray in a field angle direction corresponding to the center of the lower edge of the image field is defined by $\hat{3}$. An area where the principal rays $\hat{1}$ to $\hat{6}$ intersect each particular surface is defined as an effective area. An equation which defines the configuration of each particular surface [i.e. an expression in which the Z-axis is expressed as an axis of the surfaces or an expression in which the surface is expressed in the form of $Z=f(X,Y)$ on the assumption that the surface is not decentered] is differentiated in the effective area with respect to the Y-axis, which corresponds to the decentering direction of the surface, thereby obtaining first-order differential values DY1 to DY6 (differential values in the YZ-plane) at points where the principal rays $\hat{1}$ to $\hat{6}$ strike the surface, respectively. Second-order differential values at the points are denoted by $D^2Y1$ to $D^2Y6$, respectively, and curvatures at the points are denoted by CY1 to CY6. The defining equation is also differentiated with respect to the X-axis, which perpendicularly intersects the Y-axis, thereby obtaining first-order differential values DX1 to DX6 (differential values in a plane perpendicular to the YZ-plane) at the points where the principal rays $\hat{1}$ to $\hat{6}$ strike the surface, respectively. Second-order differential values at the points are denoted by $D^2X1$ to $D^2X6$, and curvatures at the points are denoted by CX1 to CX6.

First, at the second surface, which is a reflecting surface facing the exit pupil of the ocular optical system, it is important that all the values DY1 to DY6 should satisfy the following condition:

$$-10 < DY_{max1} < 1.0 \tag{1-1}$$

where $DY_{max1}$ denotes all the values of DY1 to DY6. The condition (1-1) limits the tilt in the direction Y of the second surface, which has a relatively strong reflective refracting power in the ocular optical system. If the effective area of the second surface, which has a principal reflective refracting power in the ocular optical system, is excessively tilted, there is a portion lacking resolution in the entire observation field. If $DY_{max1}$ is not smaller than the upper limit of the condition (1-1), i.e. 1.0, the tilt of the reflecting surface becomes excessively large with respect to the principal ray at each image height that passes through the pupil center, causing aberration due to the decentration to become excessively large and hence impossible to correct by another surface. Conversely, if $DY_{max1}$ is not larger than the lower limit of the condition (1-1), i.e. −10, it becomes impossible to lead the principal ray at each image height to the image display device. Consequently, the observation field angle becomes extremely small.

It is preferable to satisfy the following condition:

$$-1.0 < DY_{max1} < 0.5 \tag{1-2}$$

It is even more desirable to satisfy the following condition:

$$-0.5 < DY_{max1} < 0.3 \tag{1-3}$$

The above conditions are necessary to satisfy in order to obtain a favorable observation image at a wide field angle.

The condition (1-2) is particularly important to satisfy at an observation field angle of 20° or mores and it is preferable to satisfy the condition (1-3) at an observation field angle of 30° or more.

It is even more desirable to satisfy any of the conditions (1-1) to (1-3) at all reflecting surfaces of the ocular optical system. The reasons for setting the upper and lower limits, together with the meaning thereof, are the same as those stated above.

Next, regarding the second surfaces, variations in the horizontal direction from the field angle zero to the maximum field angle in the XZ-plane are specified. Assuming that differences between the degrees of tilt in the direction Y, i.e. the differential values, are expressed by DY1–DY4, DY2–DY5, and DY3–DY6, and these values are denoted by $DY_{max2}$, it is preferable for all the values to satisfy the following condition:

$$-0.2 < DY_{max2} < 0.2 \tag{2-1}$$

The condition (2-1) specifies a maximum value for the tilt of the surface in the direction Y relative to the direction X. $DY_{max2}$ represents a difference in tilt in the direction Y of the effective area between a point in the vicinity of the maximum value on the X-axis and a point on the Y-axis. If the Y-axis is taken in the vertical direction of the observer, the maximum value specified by the condition (2-1) corresponds to the expansion and contraction in the direction Y of the observation image at the left and right ends thereof. If $DY_{max2}$ is not smaller than the upper limit of the condition (2-1), i.e. 0.2, the left and right edges of the observation image change in the direction Y, and the distortion cannot be corrected by another surface. As a result, a distorted observation image is presented to the observer. The same is true for the lower limit of the condition (2-1), i.e. −0.2.

It is more desirable to satisfy the following condition:

$$-0.1 < DY_{max2} < 0.1 \tag{2-2}$$

The condition (2-2) is particularly important to satisfy in order to view an observation image having minimal distortion when it is intended to ensure an observation field angle of 20° or more.

It is even more desirable to satisfy the following condition:

$$-0.05 < DY_{max2} < 0.05 \tag{2-3}$$

The condition (2-3) is particularly important to satisfy in order to view an observation image having minimal distortion when it is intended to ensure an observation field angle of 30° or more.

It is even more desirable to satisfy the following condition:

$$-0.02 < DY_{max2} < 0.02 \quad (2\text{-}4)$$

The condition (2-4) is particularly important to satisfy in order to view an observation image having substantially no distortion when it is intended to ensure an observation field angle of 30° or more. In the case of a toric surface, $DY_{max2}$ is zeros but a large amount of comatic aberration is produced. Therefore, favorable image-formation characteristics cannot be obtained.

It is even more desirable that all reflecting surfaces of the ocular optical system should satisfy any of the conditions (2-1) to (2-4). The reasons for setting the upper and lower limits, together with the meaning thereof, are the same as those stated above.

Next, it is important for the second surface to satisfy the following condition:

$$-0.1 < DY_{max3} < 1 \quad (3\text{-}1)$$

where $DY_{max3}$ denotes (DY1–DY4)–(DY3–DY6).

$DY_{max3}$ represents a difference in tilt in the direction Y of the effective area between a point in the vicinity of the maximum value on the X-axis and a point on the Y-axis. Assuming that the Y-axis is taken in the vertical direction of the observer, $DY_{max3}$ corresponds to the symmetry between the right-upper and right-lower portions of the observation image in the vertical direction. If $DY_{max3}$ is not larger than the lower limit of the condition (3-1), i.e. –0.1, the length of the image in the vertical direction becomes excessively long, resulting in a large pincushion distortion. If $DY_{max3}$ is not smaller than the upper limit of the condition (3-1), i.e. 1, a large barrel distortion occurs.

It is more desirable to satisfy the following condition:

$$-0.05 < DY_{max3} < 0.5 \quad (3\text{-}2)$$

The condition (3-2) is particularly important to satisfy when the observation field angle exceeds 20°. It should be noted that the meaning of the upper and lower limits of the condition (3-2) is the same as in the condition (3-1).

It is even more desirable to satisfy the following conditions:

$$-0.02 < DY_{max3} < 0.1 \quad (3\text{-}3)$$

The condition (3-3) is particularly important to satisfy when the observation field angle exceeds 30°. The meaning of the upper and lower limits of the condition (3-3) is the same as in the condition (3-1). In this case also, if a toric surface is used, $DY_{max2}$ is zeros but a large amount of comatic aberration is produced. Therefore, favorable image-formation characteristics cannot be. obtained.

Assuming that differences between the differential value in the direction Y at the center of the image field and the differential values at the peripheral points in the image field, i.e. DY2–DY1, DY2–DY3, DY2–DY4, DY2–DY5, and DY2–DY6, are denoted by $DY_{max4}$, it is important for all the differences at the second surface to satisfy the following condition:

$$-0.2 < DY_{max4} < 0.2 \quad (4\text{-}1)$$

$DY_{max4}$ represents a deviation of the differential value in the direction Y at each peripheral point in the image field relative to the center of the image field. If $DY_{max4}$ is not smaller than the upper limit of the condition (4-1), i.e. 0.2, a bow-shaped image distortion occurs to a considerable extent. If $DY_{max4}$ is not larger than the lower limit of the condition (4-2), i.e. –0.2, a large bow-shaped image distortion occurs in the opposite direction to the above, and it becomes impossible to correct it by another surface.

It is preferable to satisfy the following condition:

$$-0.16 < DY_{max4} < 0.16 \quad (4\text{-}2)$$

The condition (4-2) is particularly important to satisfy when the observation field angle exceeds 20°. It should be noted that the meaning of the upper and lower limits of the condition (4-2) is the same as in the condition (4-1).

It is also important for the second surface to satisfy the following condition:

$$-0.5 < DY_{max5} < 0.08 \quad (5\text{-}1)$$

where $DY_{max5}$ denotes DY2–DY5, i.e. the difference between the differential values in the direction Y at the center of the image field and the right-hand end of the image field on the X-axis, which corresponds to the maximum field angle in the direction X.

The condition (5-1) is concerned with an image distortion in which a straight line horizontally passing through the center of the image field, e g. a horizontal line, is observed as being a bow-shaped line. If $DY_{max5}$ is not smaller than the upper limit of the condition (5-1), i.e. 0.08, a bow-shaped image distortion which is convex downwards occurs to a considerable extent, and it becomes impossible to correct the distortion by another surface. If $DY_{max5}$ is not larger than the lower limit of the condition (5-1), i.e. –0.5, a bow-shaped image distortion which is convex upwards occurs to a considerable extent, and it also becomes impossible to correct the distortion by another surface.

It is more desirable to satisfy the following condition:

$$-0.1 < DY_{max5} < 0.05 \quad (5\text{-}2)$$

The condition (5-2) is particularly important to satisfy when the observation field angle exceeds 20°. It should be noted that the meaning of the upper and lower limits of the condition (5-2) is the same as in the condition (5-1).

It is even more desirable to satisfy the following condition:

$$-0.02 < DY_{max5} < 0.01 \quad (5\text{-}3)$$

The condition (5-3) is particularly important to satisfy when the observation field angle exceeds 30°. It should be noted that the meaning of the upper and lower limits of the condition (5-3) is the same as in the condition (5-1).

Next, conditions for the differential values DX in the X-axis direction will be explained.

It is important for the second surface to satisfy the following condition:

$$-0.16 < DX_{max1} < 1.4 \quad (6\text{-}1)$$

where $DX_{max1}$ denotes DX4–DX6, i.e. a difference between the differential values DX4 and DX6 in the X-axis direction at the upper and lower ends of the right-hand edge of the image field.

$DX_{max1}$ denotes a difference in tilt in the X-axis direction between points in the effective area in the vicinity of the maximum value on the X-axis. Assuming that the Y-axis is taken in the vertical direction of the observer, $DX_{max1}$ corresponds to the symmetry between the right-upper and right-lower portions of the observation image in the horizontal direction. If $DX_{max1}$ is not larger than the lower limit of the condition (6-1), i.e. –0.16, the upper and lower portions of the observation image differ considerably in the length in the horizontal direction, resulting in a large trapezoidal image distortion in which the base is longer than the upper side. If $DX_{max1}$ is not smaller than the upper limit of the condition (6-1), i.e. 1.4, a large trapezoidal image distortion in which the upper side is longer than the base occurs.

It is preferable to satisfy the following condition:

$$-0.1 < DX_{max1} < 1 \qquad (6\text{-}2)$$

The condition (6-2) is particularly important to satisfy when the observation field angle exceeds 20°. It should be noted that the meaning of the upper and lower limits of the condition (6-2) is the same as in the condition (6-1).

It is more desirable to satisfy the following condition:

$$-0.05 < DX_{max1} < 0.05 \qquad (6\text{-}3)$$

The condition (6-3) is particularly important to satisfy when the observation field angle exceeds 30°. It should be noted that the meaning of the upper and lower limits of the condition (6-3) is the same as in the condition (6-1).

Furthers it is preferable to satisfy the following condition:

$$-0.16 < DX_{max1'} < 1.4 \qquad (7\text{-}1)$$

where $DX_{max1'}$ denotes DX4–DX6 at all reflecting surfaces constituting the ocular optical system.

This condition is necessary to satisfy in order to enable aberrations to be corrected with good balance as a whole because, if trapezoidal distortion produced by the second surface, which has a principal reflective refracting power in the entire ocular optical system, is reduced to a certain small quantity, it can be corrected by another surface with relative ease. It should be noted that the meaning of the upper and lower limits of the condition (7-1) is the same as in the condition (6-1).

It is preferable to satisfy the following condition:

$$-0.1 < DX_{max1'} < 1 \qquad (7\text{-}2)$$

The condition (7-2) is particularly important to satisfy when the observation field angle exceeds 20°. It should be noted that the meaning of the upper and lower limits of the condition (7-2) is the same as in the condition (6-1).

It is more desirable to satisfy the following condition:

$$-0.05 < DX_{max1'} < 0.05 \qquad (7\text{-}3)$$

The condition (7-3) is particularly important to satisfy when the observation field angle exceeds 30°. It should be noted that the meaning of the upper and lower limits of the condition (7-3) is the same as in the condition (6-1).

Next, astigmatism will be explained. Astigmatism occurs because the curvatures in the X- and Y-axis directions of a tilted concave mirror are different from each other relative to light rays. In order to correct the astigmatism favorably, it is important to have an appropriate difference between the curvatures in the X- and Y-axis directions at a point where a light ray strikes a reflecting surface, Assuming that a difference between second-order differentials in the X- and Y-axis directions at a point where the axial principal ray strikes a reflecting surface, i.e. $D^2X2-D^2Y2$, is denoted by $D^2XY$, and $D^2XY$ having a maximum absolute value is denoted by $D^2XY_{max1}$, it is important to satisfy the following condition:

$$-0.02 < D^2XY_{max1} < 0.04(1/mm) \qquad (8\text{-}1)$$

If the ocular optical system has a reflecting surface in which $D^2XY_{max1}$ is not smaller than the upper limit of the condition (8-1) i.e. 0.04, or not larger than the lower limit, i.e. −0.02, astigmatism produced by a tilted concave mirror becomes excessively large and hence impossible to correct by another surface.

It is preferable to satisfy the following condition:

$$-0.01 < D^2XY_{max1} < 0.02(1/mm) \qquad (8\text{-}2)$$

The condition (8-2) is particularly important to satisfy when the observation field angle exceeds 20°. It should be noted that the meaning of the upper and lower limits of the condition (8-2) is the same as in the condition (8-1).

It is more desirable to satisfy the following condition:

$$-0.005 < D^2XY_{max1} < 0.01(1/mm) \qquad (8\text{-}3)$$

The condition (8-3) is particularly important to satisfy when the observation field angle exceeds 30°. It should be noted that the meaning of the upper and lower limits of the condition (8-3) is the same as in the condition (8-1).

It is even more desirable to satisfy the following condition:

$$-0.005 < D^2XY_{max1} < 0.005(1/mm) \qquad (8\text{-}4)$$

The condition (8-4) is particularly important to satisfy when the observation field angle exceeds 35°. It should be noted that the meaning of the upper and lower limits of the condition (8-4) is the same as in the condition (8-1)

Next, conditions concerning $D^2XY_{max1}$ at the second surface will be explained. The second surface produces a large amount of astigmatism because it has a strong reflective refracting power in comparison to other surfaces and light rays are incident upon it obliquely. Assuming that $D^2XY_{max1}$ at the second surface is denoted by $D^2XY_{max1'}$, it is important to satisfy the following condition:

$$-0.02 < D^2XY_{max1'} < 0.04(1/mm) \qquad (9\text{-}1)$$

If $D^2XY_{max1'}$ at the second surface is not smaller than the upper limit of the condition (9-1), i.e. 0.04, or not larger than the lower limits i.e. −0.02, astigmatism produced by the tilted concave mirror becomes excessively large and hence impossible to correct by another surface.

It is preferable to satisfy the following condition:

$$-0.01 < D^2XY_{max1'} < 0.02(1/mm) \qquad (9\text{-}2)$$

The condition (9-2) is particularly important to satisfy when the observation field angle exceeds 20°. It should be noted that the meaning of the upper and lower limits of the condition (9-2) is the same as in the condition (9-1).

It is more desirable to satisfy the following condition:

$$-0.05 < D^2XY_{max1'} < 0.01(1/mm) \qquad (9\text{-}3)$$

The condition (9-3) is particularly important to satisfy when the observation field angle exceeds 30°. It should be noted that the meaning of the upper and lower limits of the condition (9-3) is the same as in the condition (9-1).

It is even more desirable to satisfy the following condition:

$$-0.005 < D^2XY_{max1'} < 0.005(1/mm) \qquad (9\text{-}4)$$

The condition (9-4) is particularly important to satisfy when the observation field angle exceeds 35°. It should be noted that the meaning of the upper and lower limits of the condition (9-4) is the same as in the condition (9-1).

Assuming that the values of $D^2Y1$ to $D^2Y6$ at the second surface are denoted by $D^2Y_{max1}$, it is important that all the values $D^2Y1$ to $D^2Y6$ at the second surface should satisfy the following condition:

$$-0.03 < D^2Y_{max1} < 0.006 (1/mm) \quad (10\text{-}1)$$

$D^2Y_{max1}$ represents variations in tilt of the second surface in the direction Y. If $D^2Y_{max1}$ is not smaller than the upper limit of the condition (10-1), i.e. 0.06, or not larger than the lower limits i.e. −0.03, the curvature of the surface in the effective area varies to an excessively large extent, resulting in excessively large variations of the curvature in the entire effective area of the second surface, which has a principal reflective refracting power in the ocular optical system. Consequently, it becomes impossible to view an observation image which is wide and flat over the entire observation field angle.

It is preferable to satisfy the following condition:

$$-0.03 < D^2Y_{max1} < 0.05 (1/mm) \quad (10\text{-}2)$$

It is even more desirable to satisfy the following condition:

$$-0.025 < D^2Y_{max1} < 0.05 (1/mm) \quad (10\text{-}3)$$

Both the conditions (10-2) and (10-3) are necessary to satisfy in order to obtain a favorable observation image at a wide observation field angle. The condition (10-2) is particularly important to satisfy when the observation field angle is 20° or more, and it is preferable to satisfy the condition (10-3) when the observation field angle is 30° or more.

Assuming that the values of $D^2X1$ to $D^2X6$ at the second surface are denoted by $D^2X_{max2}$, it is preferable that all the values $D^2X1$ to $D^2X6$ at the second surface should satisfy the following condition:

$$-0.03 < D^2X_{max2} < 0.1 (1/mm) \quad (11\text{-}1)$$

The condition (11-1) specifies a maximum value for the variation of the tilt of the second surface in the direction X. The condition (11-1) relates to field curvature at the left and right ends of the observation image. If $D^2X_{max2}$ is not smaller than the upper limit of the condition (11-1), i.e. 0.01, the image-formation position is too far away from the optical system, whereas, if $D^2X_{max2}$ is not larger than the lower limit of the condition (11-1) i.e. −0.03, the image-formation position is too close to the optical system. As a result, the observation image surface is undesirably curved.

It is even more desirable to satisfy the following condition:

$$-0.02 < D^2X_{max2} < 0.01 (1/mm) \quad (11\text{-}2)$$

The condition (11-2) is particularly important to satisfy in order to view an observation image having minimal field curvature when it is intended to ensure an observation field angle of 20° or more.

It is even more desirable to satisfy the following condition:

$$-0.02 < D^2X_{max2} < -0.005 (1/mm) \quad (11\text{-}3)$$

The condition (11-3) is particularly important to satisfy in order to view an observation image having minimal field curvature when it is intended to ensure an observation field angle of 30° or more.

It is even more desirable to satisfy the following condition:

$$-0.015 < D^2X_{max2} < -0.005 (1/mm) \quad (11\text{-}4)$$

The condition (11-4) is particularly important to satisfy in order to view an observation image having substantially no field curvature when it is intended to ensure an observation field angle of 30° or more. In the case of a toric surface, $D^2X_{max2}$ is zero, but a large amount of comatic aberration is produced. Therefore, favorable image-formation characteristics cannot be obtained, Assuming that values of $D^2X1$–$D^2X4$, $D^2X2$–$D^2X5$, and $D^2X3$–$D^2X6$ are denoted by $D^2X_{max3}$, it is important for all the values to satisfy the following condition:

$$-0.05 < D^2X_{max3} < 0.05 (1/mm) \quad (12\text{-}1)$$

$D^2X_{max3}$ shows how the difference between second-order differentials in the direction X at a point of X=0 and a point near the maximum value for X in the effective area varies at the upper and lower sides of the Y-axis direction. Assuming that the Y-axis is taken in the vertical direction of the observer, $D^2X_{max3}$ corresponds to the symmetry of field curvature between the right-upper and right-lower portions of the observation image in the vertical direction. If $D^2X_{max3}$ is not larger than the lower limit of the condition (12-1), i.e. −0.05, the image surface comes too close to the optical system, and it becomes impossible to correct the field curvature by another surface. If $D^2X_{max3}$ is not smaller than the upper limit of the condition (12-1), i.e. 0.05, the image surface is too far away from the optical system, and it becomes impossible to correct the field curvature by another surface. In either case, a flat image surface cannot be obtained.

It is preferable to satisfy the following condition:

$$-0.02 < D^2X_{max3} < 0.02 (1/mm) \quad (12\text{-}2)$$

The condition (12-2) is particularly important to satisfy when the observation field angle exceeds 20°. It should be noted that the meaning of the upper and lower limits of the condition (12-2) is the same as in the condition (12-1).

It is even more desirable to satisfy the following condition:

$$-0.01 < D^2X_{max3} < 0.01 (1/mm) \quad (12\text{-}3)$$

The condition (12-3) is particularly important to satisfy when the observation field angle exceeds 30°. It should be noted that the meaning of the upper and lower limits of the condition (12-3) is the same as in the condition (12-1). In the case of a toric surface, $D^2X_{max3}$ is zero, but a large amount of comatic aberration is produced. Therefore, favorable image-formation characteristics cannot be obtained.

Assuming that values of $D^2Y1$–$D^2Y4$, $D^2Y2$–$D^2Y5$, and $D^2Y3$–$D^26$ at the second surface are denoted by $D^2Y_{max4}$, it is important to satisfy the following condition:

$$-0.03 < D^2Y_{max4} < 0.05 (1/mm) \quad (13\text{-}1)$$

$D^2Y_{max4}$ shows how the difference between second-order differentials in the direction Y at a point X=0 and a point near the maximum value for X in the effective area varies at the upper and lower sides of the Y-axis direction. Assuming that the Y-axis is taken in the vertical direction of the observer, $D^2Y_{max4}$ corresponds to the symmetry of field curvature between the right-upper and right-lower portions of the observation image in the vertical direction. If $D^2Y_{max4}$ is not larger than the lower limit of the condition (13-1), i.e. −0.03, the image surface comes too close to the optical system, and it becomes impossible to correct the field curvature by another surface. If $D^2Y_{max4}$ is not smaller than the upper limit of the condition (13-1), i.e. 0.05, the image surface shifts too far away from the optical system, and it becomes impossible to correct the field curvature by another surface. In either case, a flat image surface cannot be obtained.

It is preferable to satisfy the following condition:

$$-0.02 < D^2Y_{max4} < 0.03 (1/mm) \quad (13\text{-}3)$$

The condition (13-2) is particularly important to satisfy when the observation field angle exceeds 20°. It should be noted that the meaning of the upper and lower limits of the condition (13-2) is the same as in the condition (13-1).

It is even more desirable to satisfy the following condition:

$$-0.01 < D^2Y_{max4} < 0.01 (1/mm) \quad (13\text{-}3)$$

The condition (13-3) is particularly important to satisfy when the observation field angle exceeds 30°. It should be noted that the meaning of the upper and lower limits of the condition (13-3) is the same as in the condition (13-1).

Assuming that $D^2X_{max5}$ denotes $D^2X1–D^2X3$ and $D^2X4–D^2X6$, which relate to differences between the second-order differentials with respect to the direction X at the upper and lower ends in the Y-axis direction at X=0 and at X=maximum, it is important that all reflecting surfaces should satisfy the following condition:

$$-0.05 < D^2X_{max5} < 0.05 (1/mm) \quad (14\text{-}1)$$

The condition (14-1) is necessary to satisfy in order to reduce the tilt of the image surface in the vertical direction of the image field. If $D^2X_{max5}$ is not smaller than the upper limit of the condition (14-1), i.e. 0.05, or not larger than the lower limits i.e. −0.05, the tilt of the image surface becomes excessively large and hence impossible to correct unless an image display device for forming an image to be observed is tilted to a considerable degree with respect to the axial principal rays resulting in an increase in the size of the apparatus.

It is preferable to satisfy the following condition:

$$-0.03 < D^2X_{max5} < 0.03 (1/mm) \quad (14\text{-}3)$$

The condition (14-2) is particularly important satisatisfy when the observation field angle exceeds 20°. It should be noted that the meaning of the upper and lower limits of the condition (14-2) is the same as in the condition (14-1).

It is even more desirable to satisfy the following condition:

$$-0.02 < D^2X_{max5} < 0.02 (1/mm) \quad (14\text{-}3)$$

The condition (14-3) is particularly important to satisfy when the observation field angle exceeds 25°. It should be noted that the meaning of the upper and lower limits of the condition (14-3) is the same as in the condition (14-1).

It is even more desirable to satisfy the following condition:

$$-0.01 < D^2X_{max5} < 0.01 (1/mm) \quad (14\text{-}4)$$

The condition (14-4) is particularly important to satisfy when the observation field angle exceeds 30°. It should be noted that the meaning of the upper and lower limits of the condition (14-4) is the same as in the condition (14-1).

It is even more desirable to satisfy the following condition:

$$-0.005 < D^2X_{max5} < 0.005 (1/mm) \quad (14\text{-}5)$$

The condition (14-4) is particularly important to satisfy when the observation field angle exceeds 35°. It should be noted that the meaning of the upper and lower limits of the condition (14-5) is the same as in the condition (14-1).

Assuming that $D^2Y_{max6}$ denotes $D^2Y1–D^2Y3$ and $D^2Y4–D^2Y6$, which relate to differences between the second-order differentials with respect to the direction Y at the upper and lower ends in the Y-axis direction at X=0 and at X=maximum, it is important that all reflecting surfaces should satisfy the following condition:

$$-0.03 < D^2Y_{max6} < 0.03 (1/mm) \quad (15\text{-}1)$$

The condition (15-1) is also necessary to satisfy in order to reduce the tilt of the image surface in the vertical direction of the image field. If $D^2Y_{max6}$ is not smaller than the upper limit of the condition (15-1), i.e. 0.03, or not larger than the lower limits i.e. −0.03, the tilt of the image surface becomes excessively large and hence impossible to correct unless an image display device for forming an image to be observed is tilted to a considerable degree with respect to the axial principal ray, resulting in an increase in the size of the apparatus.

It is preferable to satisfy the following condition:

$$-0.02 < D^2Y_{max6} < 0.02 (1/mm) \quad (15\text{-}2)$$

The condition (15-2) is particularly important to satisfy when the observation field angle exceeds 20°. It should be noted that the meaning of the upper and lower limits of the condition (15-2) is the same as in the condition (15-1).

It is even more desirable for the second surface to satisfy the following condition:

$$-0.01 < D^2Y_{max6} < 0.01 (1/mm) \quad (15\text{-}3)$$

The condition (15-3) is particularly important to satisfy when the observation field angle exceeds 30°. It should be noted that the meaning of the upper and lower limits of the condition (15-3) is the same as in the condition (15-1).

Assuming that $D^2XY_{max7}$ denotes a difference between the second-order differential in the direction X and the second-order differential in the direction Y at each point where each light ray strikes each particular surface in the effective area, i.e. $D^2Xn–D^2Yn$ (n is 1 to 6), it is important for all reflecting surfaces to satisfy the following condition:

$$-0.02 < D^2XY_{max7} < 0.1 (1/mm) \quad (16\text{-}1)$$

$D^2XY_{max7}$ corresponds to the image-formation positions in the directions X and Y of the effective area. The condition (16-1) is necessary to satisfy in order to effect favorable correction of astigmatism. If $D^2XY_{max7}$ is not larger than the lower limit of the condition (16-1), i.e. −0.02, light rays in the direction X are focused at a position closer to the optical system relative to light rays in the direction Y, causing astigmatism to occur to a considerable extent. If $D^2XY_{max7}$ is not smaller than the upper limit of the condition (16-1), i.e. 0.1, light rays in the direction X are focused at a position further away from the optical system relative to light rays in the direction Y, causing astigmatism to occur to a considerable extent in reverse relation to the above. In either case, it becomes impossible to correct astigmatism by another surface. In the case of a surface having symmetry with respect to both the Y- and X-axes, e.g. a toric surface, $D^2XY_{max7}$ falls within the range of the condition (16-1). However, such a surface produces a large amount of coma and image distortion.

It is preferable to satisfy the following condition:

$$-0.018 < D^2XY_{max7'} < 0.5 (1/mm) \quad (16\text{-}2)$$

The condition (16-2) is particularly important to satisfy when the observation field angle exceeds 20°.

It is even more desirable to satisfy the following condition:

$$-0.015 < D^2XY_{max7'} < 0.02 (1/mm) \quad (16\text{-}3)$$

The condition (16-3) is particularly important to satisfy when the observation field angle exceeds 25°.

It is even more desirable to satisfy the following condition:

$$-0.01 < D^2XY_{max7'} < 0.01 (1/mm) \quad (16\text{-}4)$$

The condition (16-4) is particularly important to satisfy when the observation field angle exceeds 30°.

Regarding the condition (16-1) it is important for the second surface to satisfy the following condition:

$$-0.1 < D^2XY_{max7'} < 0.08 (1/mm) \quad (17\text{-}1)$$

where $D^2XY_{max7'}$ denotes $D^2Xn-D^2Yn$ (n is 1 to 6) at the second surface.

The meaning of the upper limit 0.08 and the lower limit −0.1 is the same as in the condition (16-1). It is particularly important for the second surface to satisfy the condition (17-1) to thereby correct astigmatism with good balance because the second surface, which has the strongest positive reflective refracting power in the optical system and which is tilted, produces a large amount of astigmatism. When the second surface is a surface having symmetry with respect to both the Y- and X-axes, e.g. a toric surface, $D^2XY_{max7'}$ falls within the range of the condition (17-1). However, such a surface produces a large amount of coma and image distortion.

It is preferable to satisfy the following condition:

$$-0.1 < D^2XY_{max7'} < 0.05 (1/mm) \quad (17\text{-}2)$$

The condition (17-2) is particularly important to satisfy when the observation field angle exceeds 20°.

It is even more desirable to satisfy the following condition:

$$-0.05 < D^2XY_{max7'} < 0.02 (1/mm) \quad (17\text{-}3)$$

The condition (17-3) is particularly important to satisfy when the observation field angle exceeds 25°.

It is even more desirable to satisfy the following condition:

$$-0.01 < D^2XY_{max7'} < 0.01 (1/mm) \quad (17\text{-}4)$$

The condition (17-4) is particularly important to satisfy when the observation field angle exceeds 30°.

Next, it is important to satisfy the following condition:

$$0.13 < D^2X9 < 1.15 \quad (18\text{-}1)$$

where $D^2X9$ denotes a value determined by dividing $D^2X2$ of a reflecting surface facing the image display device of the ocular optical system (in the case of an arrangement as shown in FIG. 15 or 20, the first surface serves as both a transmitting surface and a reflecting surface) by $D^2X2$ of the second surface.

The condition (18-1) expresses the ratio of the second-order differential in the direction X of a reflecting surface facing the image display device and having a principal reflective refracting power in the entire optical system to the second-order differential in the direction X of a reflecting surface facing the exit pupil. The condition (18-1) relates to a conventional paraxial power distribution necessary in order to increase the distance from the optical system to the pupil position and to make the emergent principal ray inclination angle on the observation image side as close to a right angle to the observation image display surface as possible. If $D^2X9$ is not larger than the lower limit of the condition (18-1), i.e. 0.13, the front focus of the optical system increases, but the back focus becomes excessively short, causing the surface for displaying an image to be observed and the optical system body to interfere with each other. Consequently, the components of the apparatus cannot properly be disposed. If $D^2X9$ is not smaller than the upper limit of the condition (18-1), i.e. 1.15, the back focus increases, but the front focus of the optical system becomes excessively short, making it difficult for the observer to view the displayed image with his or her glasses on.

It is preferable to satisfy the following condition:

$$0.2 < D^2X9 < 1 \quad (18\text{-}2)$$

The condition (18-2) is particularly important to satisfy when the observation field angle exceeds 20°. It should be noted that the meaning of the upper and lower limits of the condition (18-2) is the same as in the condition (18-1).

It is even more desirable to satisfy the following condition:

$$0.3 < D^2X9 < 0.8 \quad (18\text{-}3)$$

The condition (18-3) is particularly important to satisfy when the observation field angle exceeds 30°. It should be noted that the meaning of the upper and lower limits of the condition (18-3) is the same as in the condition (18-1)

Next, it is important to satisfy the following condition:

$$0.14 < D^2Y10 < 5 \quad (19\text{-}1)$$

where $D^2Y10$ denotes a value determined by dividing $D^2Y2$ of a reflecting surface facing the image display device of the ocular optical system by $D^2Y2$ of the second surface.

The condition (19-1) expresses the ratio of the second-order differential in the direction Y of a reflecting surface facing the image display device and having a principal reflective refracting power in the entire optical system to the second-order differential in the direction X of a reflecting surface facing the exit pupil. The condition (19-1) relates to a conventional paraxial power distribution necessary in order to increase the distance from the optical system to the pupil position and to make the emergent principal ray inclination angle on the observation image side as close to right angles to the observation image display surface as possible. If $D^2Y10$ is not larger than the lower limit of the condition (19-1). i.e. 0.14, the front focus of the optical system increases, but the back focus becomes excessively short, causing the surface for displaying an image to be observed and the optical system body to interfere with each other. Consequently, the components of the apparatus cannot properly be disposed. If $D^2Y10$ is not smaller than the upper limit of the condition (19-1), i.e. 5, the back focus increases, but the front focus of the optical system becomes excessively short, making it difficult for the observer to view the displayed image with his or her glasses on.

It is preferable to satisfy the following condition:

$$0.15 < D^2Y10 < 4 \quad (19\text{-}2)$$

The condition (19-2) is particularly important to satisfy when the observation field angle exceeds 20°. It should be noted that the meaning of the upper and lower limits of the condition (19-2) is the same as in the condition (19-1).

It is even more desirable to satisfy the following condition:

$$0.2 < D^2Y10 < 3 \quad (19\text{-}3)$$

The condition (19-3) is particularly important to satisfy when the observation field angle exceeds 25°. It should be noted that the meaning of the upper and lower limits of the condition (19-3) is the same as in the condition (19-1).

It is even more desirable to satisfy the following condition:

$$0.25 < D^2Y10 < 1 \quad (19\text{-}4)$$

The condition (19-4) is particularly important to satisfy when the observation field angle exceeds 30°. It should be noted that the meaning of the upper and lower limits of the condition (19-4) is the same as in the condition (19-1).

Next, it is important to satisfy the following condition:

$$0.55 < D^2XY11 < 4.0 \quad (20\text{-}1)$$

where $D^2XY11$ denotes the value of $D^2X2/D^2Y2$ of a reflecting surface facing the image display device of the ocular optical system.

$D^2XY11$ corresponds to the refracting power of that portion of a reflecting surface which is struck by principal rays in the directions X and Y relative to the axial principal rays which reflecting surface is disposed to face the image display device such that the axial principal ray is incident on the surface with the largest angle of inclination in the entire optical system. The condition (20-1) relates mainly to astigmatism. If $D^2XY11$ is not larger than the lower limit of the condition (20-1), i.e. 0.55, or not smaller than the upper limit, i.e. 4.0, astigmatism that is produced by the surface when light rays are reflected thereby becomes excessively large and hence difficult to correct by another surface.

It is preferable to satisfy the following condition:

$$0.6 < D^2XY11 < 3.5 \quad (20\text{-}2)$$

The condition (20-2) is particularly important to satisfy when the observation field angle exceeds 20°. The meaning of the upper and lower limits of the condition (20-2) is the same as in the condition (20-1).

It is even more desirable to satisfy the following condition:

$$0.7 < D^2XY11 < 3.0 \quad (20\text{-}3)$$

The condition (20-3) is particularly important to satisfy when the observation field angle exceeds 25°. It should be noted that the meaning of the upper and lower limits of the condition (20-3) is the same as in the condition (20-1).

It is even more desirable to satisfy the following condition:

$$0.8 < D^2XY11 < 2.5 \quad (20\text{-}4)$$

The condition (20-4) is particularly important to satisfy when the observation field angle exceeds 30°. It should be noted that the meaning of the upper and lower limits of the condition (20-4) is the same as in the condition (20-1).

Next, it is important to satisfy the following condition:

$$0.55 < D^2XY12 < 5 \quad (21\text{-}1)$$

where $D^2XY12$ denotes the value of $D^2X2/D^2Y2$ of the second surface facing the exit pupil.

The condition (21-1) relates to astigmatism, as is the case with the condition (20-1). The meaning of the upper limit 5 and the lower limit 0.55 is the same as in the condition (20-1).

It is preferable to satisfy the following condition:

$$0.6 < D^2XY12 < 4 \quad (21\text{-}2)$$

The condition (21-2) is particularly important to satisfy when the observation field angle exceeds 20°. It should be noted that the meaning of the upper and lower limits of the condition (21-2) is the same as in the condition (20-1).

It is even more desirable to satisfy the following condition:

$$0.7 < D^2XY12 < 3 \quad (21\text{-}3)$$

The condition (21-3) is particularly important to satisfy when the observation field angle exceeds 25°. It should be noted that the meaning of the upper and lower limits of the condition (21-3) is the same as in the condition (20-1).

It is even more desirable to satisfy the following condition:

$$0.8 < D^2XY12 < 2 \quad (21\text{-}1)$$

The condition (21-4) is particularly important to satisfy when the observation field angle exceeds 30°. It should be noted that the meaning of the upper and lower limits of the condition (21-4) is the same as in the condition (20-1).

Next, conditions for the curvature of a reflecting surface will be explained.

Assuming that CX1 and CY2 at the second surface, which is a reflecting surface facing the exit pupil of the ocular optical system, are denoted by $CX2_2$ and $CY2_2$, respectively, it is desirable to satisfy both of the following conditions:

$$0.001 < |CX2_2|(1/\text{mm}) \quad (22\text{-}1)$$

$$0.001 < |CX2_2|(1/\text{mm}) \quad (22\text{-}2)$$

These conditions have been set because it is possible to shorten the distance between the pupil and the image-formation plane (i.e. the surface of the image display device) and hence possible to form a compact and lightweight head-mounted image display apparatus by providing the second surface, which is a reflecting surface in the form of a plane-symmetry three-dimension are reflective refraction-zero reflective refracting power relative to the axis principal ray. If either $CX2_2$ or $CY2_2$ is not larger than the lower limit 0.001, it becomes difficult to form a compact ocular optical system.

It is even more desirable for both the curvatures $CX2_2$ and $CY2_2$ of the second surface to satisfy the following conditions:

$$0.005 < |CX2_2|(1/\text{mm}) \quad (22\text{-}1')$$

$$0.005 < |CX2_2|(1/\text{mm}) \quad (22\text{-}2')$$

Thus, a plane-symmetry three-dimensional surface according to the present invention can be introduced into a concave mirror serving as the second surface that carries the strongest refracting power in the ocular optical system of the head-mounted image display apparatus, thereby enabling favorable correction of various aberrations in the entire system, e.g. image distortion, astigmatism, coma, etc.

Incidentally, it is desirable to satisfy the following condition:

$$0.055 < CX2M/CY2M < 2 \quad (23\text{-}1)$$

where CY2M and CX2M denote curvatures in the directions Y and X, respectively, of that portion of a surface having the strongest reflective refracting power in the optical system which is struck by the axial principal ray $\hat{2}$, which passes through the center of the exit pupil and reaches the center of the image to be observed.

The condition (23-1) is necessary to satisfy in order to reduce astigmatism produced by a decentered reflecting mirror. In the case of a spherical surface, CX2M/CY2M=1. However, a decentered spherical surface produces a large amount of aberration such as image distortion, astigmatism, coma, etc. Therefore, if a decentered surface is formed by using a spherical surface, it is difficult to completely correct astigmatism on the optical axis, and the residual astigmatism makes it difficult to view a clear observation image even at the center of the visual field. Only when a reflecting surface having the strongest reflective refracting power in the optical system is formed by using a surface having only one plane of symmetry, and the condition (23-1) is satisfied, the various aberrations can be favorably corrected, and it becomes possible to view an observation image having no astigmatism even on the optical axis. The upper limit 2 and the lower limit 0.055 are limits within which astigmatism is minimized.

It is preferable to satisfy the following condition:

$$0.1 < CX2M/CY2M < 2.0 \tag{23-2}$$

It is even more desirable to satisfy the following condition:

$$0.8 < CX2M/CY2M < 1.5 \tag{23-3}$$

It is even more desirable to satisfy the following condition:

$$1.0 < CX2M/CY2M < 1.35 \tag{23-4}$$

The meaning of the upper and lower limits of the conditions (23-2) to (23-4) is the same as in the condition (23-1). However, because the tolerance for astigmatism varies according to the pupil diameter of the observer's eyeball, which varies with the brightness of the observation image, it is preferable to satisfy the condition (23-4) as the pupil diameter increases.

It should be noted that in Examples (described later) the second surface has the strongest reflective refracting power.

Next, conditions for the reflective refracting power of a reflecting surface will be shown. In a decentered optical system in which a reflecting surface is given a principal refracting power in the entire optical system, which is a feature of the present invention, different aberrations occur at each image position. Therefore, correction of various aberrations must be effected by changing the configuration of the reflecting surface, and the amount of change in the configuration of the reflecting surface subtly varies according to positions on the reflecting surface. It is, however, important to satisfy the following conditions. That is, it is preferable from the viewpoint of aberration correction to satisfy the following condition:

$$-0.015 < CX_{n2} < 0.1 (1/mm) \tag{24-1}$$

where $CX_{n2}$ denotes CXn-CX2, i.e. differences between the curvature CX2 in the direction X of that portion of each of all reflecting surfaces at which the axial principal ray $\hat{2}$ is reflected and the curvatures CXn (n is 1, 3 to 6) in the direction X of those portions of each reflecting surface which are struck by the rays $\hat{1}$ and $\hat{3}$ to $\hat{6}$ in the directions of maximum observation field angles.

If $CX_{n2}$ is not smaller than the upper limit of the condition (24-1), i.e. 0.1, or not larger than the lower limits i.e. −0.015, the curvature in the effective area of each reflecting surface becomes excessively large. At the second surface, which has a principal reflective refracting power in the ocular optical system, the curvature in the entire effective area changes to an excessively large extent, making it impossible to view an observation image which is wide and flat over the entire observation field angle.

It is preferable to satisfy the following condition:

$$-0.015 < CX_{n2} < 0.05 (1/mm) \tag{24-2}$$

The condition (24-2) is particularly important to satisfy when the observation field angle exceeds 20°.

It is even more desirable to satisfy the following condition:

$$-0.01 < CX_{n2} < 0.01 (1/mm) \tag{24-3}$$

The condition (24-3) is particularly important to satisfy when the observation field angle exceeds 30°. Both the conditions (24-2) and (24-3) are necessary to satisfy in order to obtain a favorable observation image at a wide observation field angle.

Next, it is important that a surface having the strongest refracting power in the ocular optical system should further satisfy the following condition. The following condition is important in order to corrects with good balance, all aberrations which are produced by a surface decentered and having only one plane of symmetry, as is the case with the condition (24-1).

It is preferable from the viewpoint of aberration correction to satisfy the following condition:

$$-0.015 < CX_{n2}M < 0.1 (1/mm) \tag{25-1}$$

where $CX_{n2}M$ denotes CXn-CX2, i.e. differences between the curvature CX2 in the direction X of that portion of a reflecting surface at which the axial principal ray $\hat{2}$ is reflected, which reflecting surface has the strongest reflective refracting power in the optical system, and the curvatures CXn (n is 1, 3 to 6) in the direction X of those portions of the surface which are struck by the rays $\hat{1}$ and $\hat{3}$ to $\hat{6}$ in the directions of maximum observation field angles.

If $CX_{n2M}$ is not smaller than the upper limit of the condition (25-1), i.e. 0.1 or not larger than the lower limits i.e. −0.015, the curvature of the surface in the effective area becomes excessively large. At the second surface, which has a principal reflective refracting power in the ocular optical system, the curvature in the entire effective area changes to an excessively large extent, making it impossible to view an observation image which is wide and flat over the entire observation field angle.

It is preferable to satisfy the following condition:

$$-0.01 < CX_{n2}M < 0.05 (1/mm) \tag{25-2}$$

The condition (25-2) is particularly important to satisfy when the observation field angle exceeds 20°.

It is even more desirable to satisfy the following condition:

$$-0.01 < CX_{n2}M < 0.01 (1/mm) \tag{25-3}$$

The condition (25-3) is particularly important to satisfy when the observation field angle exceeds 30°. Both the conditions (25-2) and (25-3) are necessary to satisfy in order to obtain a favorable observation image at a wide observation field angle.

Next, it is preferable from the viewpoint of aberration correction to satisfy the following condition:

$$-0.1 < CY_{n2}A < 0.1 (1/mm) \qquad (26\text{-}1)$$

where $CY_{n2}A$ denotes CYn-CY2, i.e. differences between the curvature CY2 in the direction Y of that portion of each of all reflecting surfaces at which the axial principal ray $\hat{2}$ is reflected and the curvatures CYn (n is 1, 3 to 6) in the direction Y of those portions of each reflecting surface which are struck by the rays $\hat{1}$ and $\hat{3}$ to $\hat{6}$ in the directions of maximum observation field angles, as is the case with the condition (24-1).

If $CY_{n2}A$ is not smaller than the upper limit of the condition (26-1), i.e. 0.1 or not larger than the lower limit, i.e. −0.1, the curvature of each reflecting surface in the effective area becomes excessively large. At the second surface, which has a principal reflective refracting power in the ocular optical system, the curvature in the entire effective area changes to an excessively large extent, making it impossible to view an observation image which is wide and flat over the entire observation field angle.

It is preferable to satisfy the following condition:

$$-0.05 < CY_{n2}A < 0.05 (1/mm) \qquad (26\text{-}2)$$

The condition (26-2) is particularly important to satisfy when the observation field angle is about 20°.

It is even more desirable to satisfy the following condition:

$$-0.02 < CY_{n2}A < 0.02 (1/mm) \qquad (26\text{-}3)$$

The condition (26-3) is particularly important to satisfy when the observation field angle is about 30°.

It is even more desirable to satisfy the following condition:

$$-0.01 < CY_{n2}A < 0.01 (1/mm) \qquad (26\text{-}4)$$

The condition (26-4) is particularly important to satisfy when the observation field angle exceeds 30°.

All the conditions (26-2) to (26-4) are necessary to satisfy in order to obtain a favorable observation image at a wide observation field angle.

Next, it is important that a surface having a particularly strong reflective refracting power in the ocular optical system should further satisfy the following condition. The following condition is important in order to correct, with good balance, all aberrations which are produced by a surface decentered and having only one plane of symmetry, as is the case with the condition (24-1).

It is preferable from the viewpoint of aberration correction to satisfy the following condition:

$$-0.015 < CY_{n2}M < 0.1 (1/mm) \qquad (27\text{-}1)$$

where $CY_{n2}M$ denotes CYn-CY2, i.e. differences between the curvature CY2 in the direction Y of that portion of a reflecting surface at which the axial principal ray $\hat{2}$ is reflected, which reflecting surface has the strongest reflective refracting power in the optical system, and the curvatures CYn (n is 1, 3 to 6) in the direction Y of those portions of the surface which are struck by the rays $\hat{1}$ and $\hat{3}$ to $\hat{6}$ in the directions of maximum observation field angles.

If $CY_{n2}M$ is not smaller than the upper limit of the condition (27-1), i.e. 0.1, or not larger than the lower limit, i.e. −0.015, the curvature of the surface in the effective area becomes excessively large. At the second surface, which has a principal reflective refracting power in the ocular optical systems the curvature in the entire effective area changes to an excessively large extent, making it impossible to view an observation image which is wide and flat over the entire observation field angle.

It is preferable to satisfy the following condition:

$$-0.02 < CY_{n2}M < 0.02 (1/mm) \qquad (27\text{-}2)$$

The condition (27-2) is particularly important to satisfy when the observation field angle exceeds 20°.

It is even more desirable to satisfy the following condition:

$$-0.01 < CY_{n2}M < 0.01 (1/mm) \qquad (27\text{-}3)$$

The condition (27-3) is particularly important to satisfy when the observation field angle exceeds 30°. Both the conditions (27-2) and (27-3) are necessary to satisfy in order to obtain a favorable observation image at a wide observation field angle.

Next, it is important for all reflecting surfaces to satisfy the following condition:

$$CXYA < 40 \qquad (28\text{-}1)$$

where CXYA denotes values respectively determined by dividing the curvatures in the direction X at those portions of each surface which are struck by the principal rays in the effective area by the curvatures in the direction Y at these portions, i.e. |CXn|/|CYn| (n is 1 to 6).

CXYA corresponds to the range of image-formation positions in the directions X and Y of the effective area. The condition (28-1) must be satisfied in order to effect favorable correction of astigmatism. If CXYA is not smaller than the upper limit of the condition (28-1), i.e. 40, the deviation of the image-formation positions in the directions X and Y becomes excessively large and hence impossible to correct by another surface. In the case of a surface having symmetry with respect to both the Y- and X-axes, e.g. a toric surface, CXYA falls within the range of the condition (28-1). However, such a surface produces a large amount of coma and image distortion.

It is preferable to satisfy the following condition:

$$CXYA < 20 \qquad (28\text{-}2)$$

The condition (28-2) is particularly important to satisfy when the observation field angle exceeds 20°.

It is even more desirable to satisfy the following condition:

$$CXYA < 20 \qquad (28\text{-}3)$$

The condition (28-3) is particularly important to satisfy when the observation field angle exceeds 25°.

It is even more desirable to satisfy the following condition:

$$CXYA < 40 \qquad (29\text{-}1)$$

The condition (28-4) is particularly important to satisfy when the observation field angle exceeds 30°.

Next, it is important that a surface having the strongest reflective refracting power in the optical system should satisfy the following condition:

$$CXYM < 40 \qquad (29\text{-}1)$$

where CXYM denotes values respectively determined by dividing the curvatures in the direction X of a surface having the strongest reflective refracting power in the optical system by the curvatures in the direction Y, i.e. $|CXn|/|CYn|$ (n is 1 to 6).

CXYM corresponds to the range of image-formation positions in the directions X and Y of the effective area. The condition (29-1) must be satisfied in order to effect favorable correction of astigmatism. If CXYM is not smaller than the upper limit of the condition (29-1), i.e. 40, the deviation of the image-formation positions in the directions X and Y becomes excessively large and hence impossible to correct by another surface. In the case of a surface having symmetry with respect to both the Y- and X-axes, e.g. a toric surface, CXYM falls within the range of the condition (29-1). However, such a surface produces a large amount of coma and image distortion.

It is preferable to satisfy the following condition:

$$CXYM<20 \tag{29-2}$$

The condition (29-2) is particularly important to satisfy when the observation field angle exceeds 20°.

It is even more desirable to satisfy the following condition:

$$CXYM<10 \tag{29-3}$$

The condition (29-3) is particularly important to satisfy when the observation field angle exceeds 25°.

It is even more desirable to satisfy the following condition:

$$CXYM<6 \tag{29-4}$$

The condition (29-4) is particularly important to satisfy when the observation field angle exceeds 30°.

Next, it is important to satisfy the following condition:

$$-5<CX12<5 \tag{30-1}$$

where CX12 denotes a value determined by dividing CX2 of a reflecting surface facing the image display device of the ocular optical system (in the case of an arrangement as shown in FIG. 15 or 20, the first surface serves as both a transmitting surface and a reflecting surface) by CX2 of the second surface.

The condition (30-1) expresses the ratio of the curvature in the direction X of the first surface to the curvature in the direction X of the second surface, the first and second surfaces being surfaces having a principal reflective refracting power in the entire optical system. The condition (30-1) relates to a conventional paraxial power distribution necessary in order to increase the distance from the optical system to the pupil position and to make the emergent principal ray inclination angle on the observation image side as close to right angles to the observation image display surface as possible. If CX12 is not larger than the lower limit of the condition (30-1), i.e. −5, the front focus of the optical system increases, but the back focus becomes excessively short, causing the surface for displaying an image to be observed and the optical system body to interfere with each other. Consequently, the components of the apparatus cannot properly be disposed. If CX12 is not smaller than the upper limit of the condition (30-1), i.e. 5, the back focus increases, but the front focus of the optical system becomes excessively short, making it difficult for the observer to view the displayed image with his or her glasses on.

It is preferable to satisfy the following condition:

$$0.1<CX12<2 \tag{30-2}$$

The condition (30-2) is particularly important to satisfy when the observation field angle is not more than 20°.

It is even more desirable to satisfy the following condition:

$$0.3<CX12<1 \tag{30-3}$$

The condition (30-3) is particularly important to satisfy when the observation field angle is not more than 30°. It should be noted that the meaning of the upper and lower limits of the condition (30-3) is the same as in the condition (30-1).

It is even more desirable to satisfy the following condition:

$$0.3<CX12<0.8 \tag{30-4}$$

The condition (30-4) is particularly important to satisfy when the observation field angle exceeds 30°. It should be noted that the meaning of the upper and lower limits of the condition (30-4) is the same as in the condition (30-1).

Next, it is important to satisfy the following condition:

$$-5<CY12<5 \tag{31-1}$$

where CY12 denotes a value determined by dividing CY2 of a reflecting surface facing the image display device of the ocular optical system by CY2 of the second surface.

The condition (31-1) expresses the ratio of the curvature in the direction Y of the first surface to the curvature in the direction Y of the second surface, the first and second surfaces being surfaces having a principal reflective refracting power in the entire optical system. The condition (31-1) relates to a conventional paraxial power distribution necessary in order to increase the distance from the optical system to the pupil position and to make the emergent principal ray inclination angle on the observation image side as close to right angles to the observation image display surface as possible. If CY12 is not larger than the lower limit of the condition (31-1), i.e. −5, the front focus of the optical system increases but the back focus becomes excessively short, causing the surface for displaying an image to be observed and the optical system body to interfere with each other. Consequently, the components of the apparatus cannot properly be disposed. If CY12 is not smaller than the upper limit of the condition (31-1), i.e. 5, the back focus increase, but the front focus of the optical system becomes excessively short, making it difficult for the observer to view the displayed image with his or her glasses on.

It is preferable to satisfy the following condition:

$$0.15<CY12<4 \tag{31-2}$$

The condition (31-2) is particularly important to satisfy when the observation field angle exceeds 20°. It should be noted that the meaning of the upper and lower limits of the condition (31-2) is the same as in the condition (31-1).

It is even more desirable to satisfy the following condition:

$$0.2<CY12<3 \tag{31-3}$$

The condition (31-3) is particularly important to satisfy when the observation field angle exceeds 25°. It should be noted that the meaning of the upper and lower limits of the condition (31-3) is the same as in the condition (31-1).

It is even more desirable to satisfy the following condition:

$$0.25<CY12<1 \tag{31-4}$$

The condition (31-4) is particularly important to satisfy when the observation field angle exceeds 30°. It should be noted that the meaning of the upper and lower limits of the condition (31-4) is the same as in the condition (31-1).

Next, it is important to satisfy the following condition:

$$0.3 < CXY11 < 4.0 \qquad (32\text{-}1)$$

where CXY11 denotes the value of CX2/CY2 of a reflecting surface facing the image display device of the ocular optical system.

CXY11 corresponds to the ratio between the curvatures in the directions X and Y of that portion of the first surface which is struck by the axial principal ray, the first surface being a reflecting surface disposed such that the axial principal ray is incident on the surface with the largest angle of inclination in the entire optical system. The condition (32-1) relates mainly to astigmatism. If CXY11 is not larger than the lower limit of the condition (32-1), i.e. 0.3, or not smaller than the upper limit, i.e. 4.0, astigmatism that is produced by the surface when light rays are reflected thereby becomes excessively large and hence difficult to correct by another surface.

It is preferable to satisfy the following condition:

$$0.6 < CXY11 < 3.5 \qquad (32\text{-}2)$$

The condition (32-2) is particularly important to satisfy when the observation field angle exceeds 20°. The meaning of the upper and lower limits of the condition (32-2) is the same as in the condition (32-1).

It is even more desirable to satisfy the following condition:

$$0.7 < CXY11 < 3.0 \qquad (32\text{-}3)$$

The condition (32-3) is particularly important to satisfy when the observation field angle exceeds 25°. It should be noted that the meaning of the upper and lower limits of the condition (32-3) is the same as in the condition (32-1).

It is even more desirable to satisfy the following condition:

$$0.8 < CXY11 < 2.5 \qquad (32\text{-}4)$$

The condition (32-4) is particularly important to satisfy when the observation field angle exceeds 30°. It should be noted that the meaning of the upper and lower limits of the condition (32-4) is the same as in the condition (32-1).

The above-described conditions (1-1) to (21-4) are applicable not only in a case where the surface configuration of any of the reflecting surfaces constituting an ocular optical system is a plane-symmetry three-dimensional surface which has no axis of rotational symmetry in the surface, nor out of the surface, and which has only one plane of symmetry, but also in a case where the surface configuration is an anamorphic surface having no axis of rotational symmetry in the surface, nor out of the surface. That is, a non-rotationally symmetric surface configuration having no axis of rotational symmetry in the surface, nor out of the surface. Particularly, the conditions (4-1) and (4-2) in the foregoing description are conditions concerning a reflecting surface which faces the exit pupil of the ocular optical system; however, when any of the reflecting surfaces constituting the ocular optical system is formed with a non-rotationally symmetric surface configuration having no axis of rotational symmetry in the surface, nor out of the surface, the conditions (4-1) and (4-2) are also applicable to the reflecting surface of the non-rotationally symmetric surface configuration. The conditions (20-1) to (20-4) are also applicable in a case where a reflecting surface which faces the image display device is formed with a non-rotationally symmetric surface configuration having no axis of rotational symmetry in the surface, nor out of the surface. The conditions (21-1) to (21-4) are also applicable in a case where a reflecting surface other than a reflecting surface facing the image display device is formed with a non-rotationally symmetric surface configuration having no axis of rotational symmetry in the surface, nor out of the surface.

Although the above various conditions have been explained mainly on the assumption that the ocular optical system uses a prism member 7 as shown in FIG. 15, which has a first surface 3, a second surface 4, and a third surface 5, and in which a space lying between these surfaces is filled with a medium having a refractive index (n) larger than 1 (n>1), it should be noted that the conditions are also similarly applicable to other prism members 7 as shown in FIGS. 16 to 22.

Still other objects and advantages of the invention will in part be obvious and will in part be apparent from the specification.

The invention accordingly comprises the features of constructions combinations of element, and arrangement of parts which will be exemplified in the construction hereinafter set forth, and the scope of the invention will be indicated in the claims.

BRIEF DESCRIPTION OF THE DRAWINGS

FIGS. 26(a) and 26(b) each show an optical system of still another conventional head-mounted image display apparatus.

DESCRIPTION OF THE PREFERRED EMBODIMENTS

Examples 1 to 6 of the head-mounted image display apparatus according to the present invention will be described below.

Figure 1:
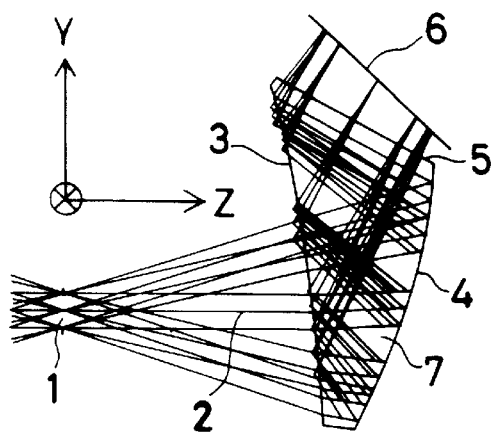
FIG. 1 is a sectional view of an optical system for a single eye of a head-mounted image display apparatus which uses an ocular optical system according to Example 1 of the present invention.
Figure 2:
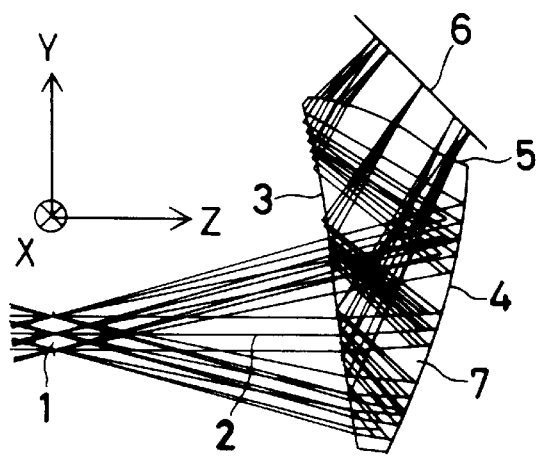
FIG. 2 is a sectional view of an optical system for a single eye of a head-mounted image display apparatus which uses an ocular optical system according to Example 2 of the present invention.
Figure 3:
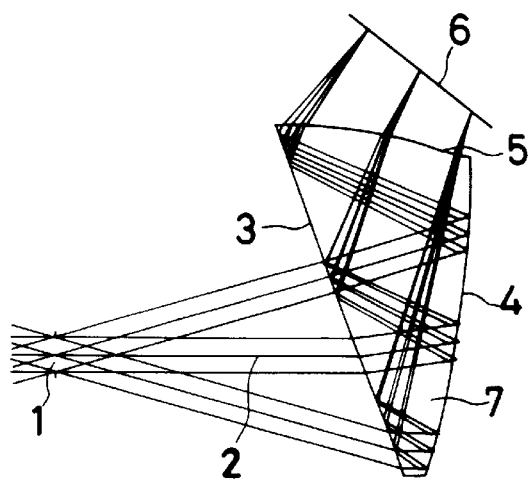
FIG. 3 is a sectional view of an optical system for a single eye of a head-mounted image display apparatus which uses an ocular optical system according to Example 3 of the present invention.
Figure 4:
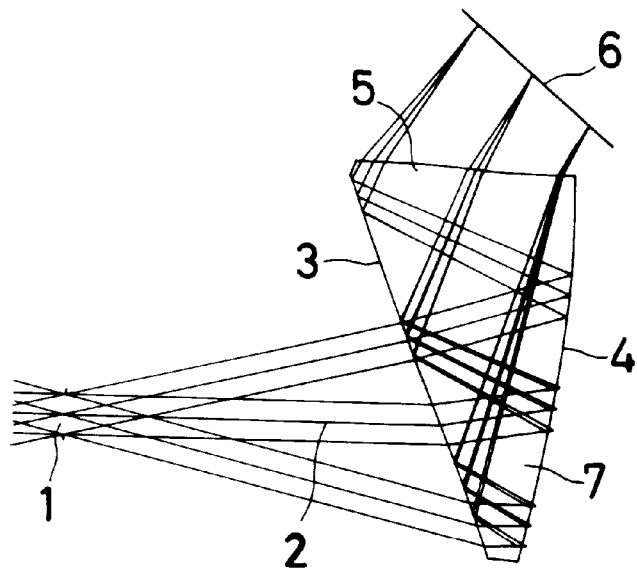
FIG. 4 is a sectional view of an optical system for a single eye of a head-mounted image display apparatus which uses an ocular optical system according to Example 4 of the present invention.
Figure 5:
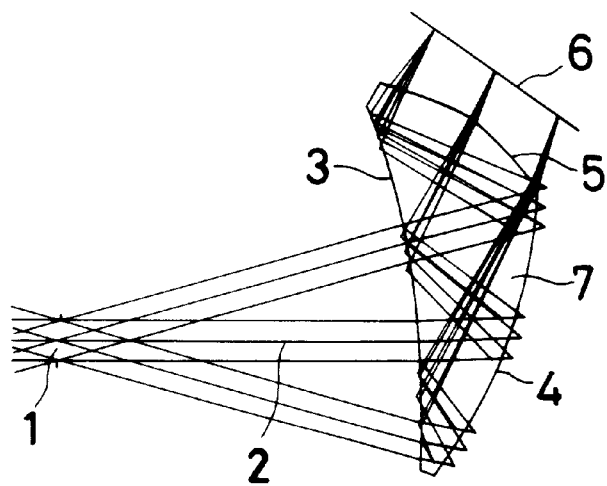
FIG. 5 is a sectional view of an optical system for a single eye of a head-mounted image display apparatus which uses an ocular optical system according to Example 5 of the present invention.
Figure 6:
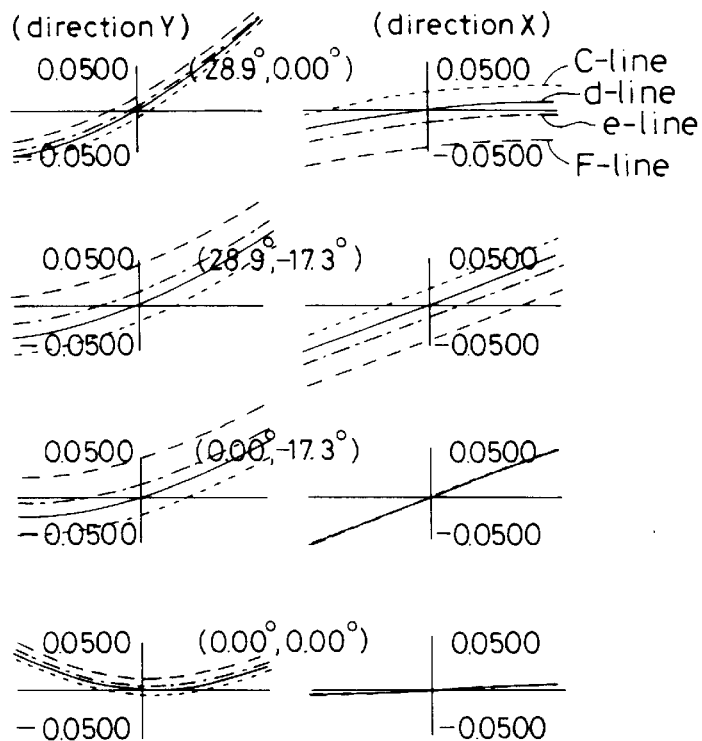
FIG. 6 is a part of an aberrational diagram illustrating lateral aberrations in the ocular optical system according to Example 1 of the present invention.
Figure 7:
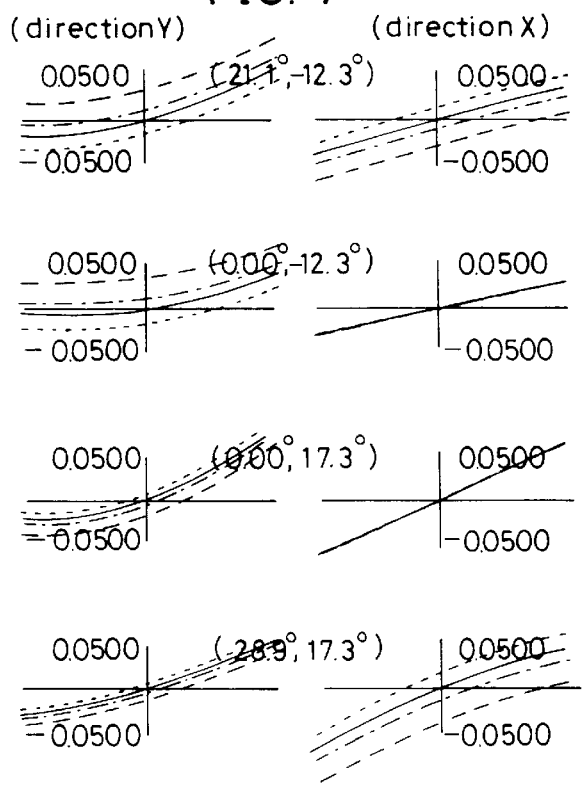
FIG. 7 is another part of the aberrational diagram illustrating lateral aberrations in the ocular optical system according to Example 1 of the present invention.
Figure 8:
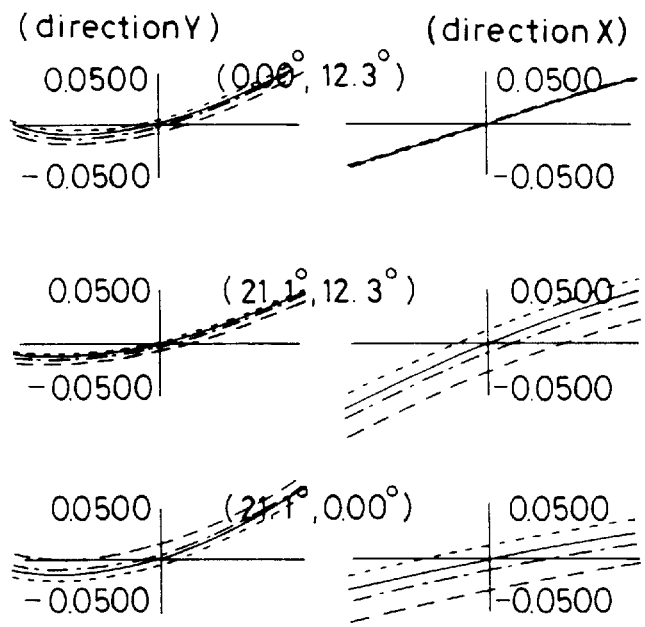
FIG. 8 is the other part of the aberrational diagram illustrating lateral aberrations in the ocular optical system according to Example 1 of the present invention.
Figure 9:
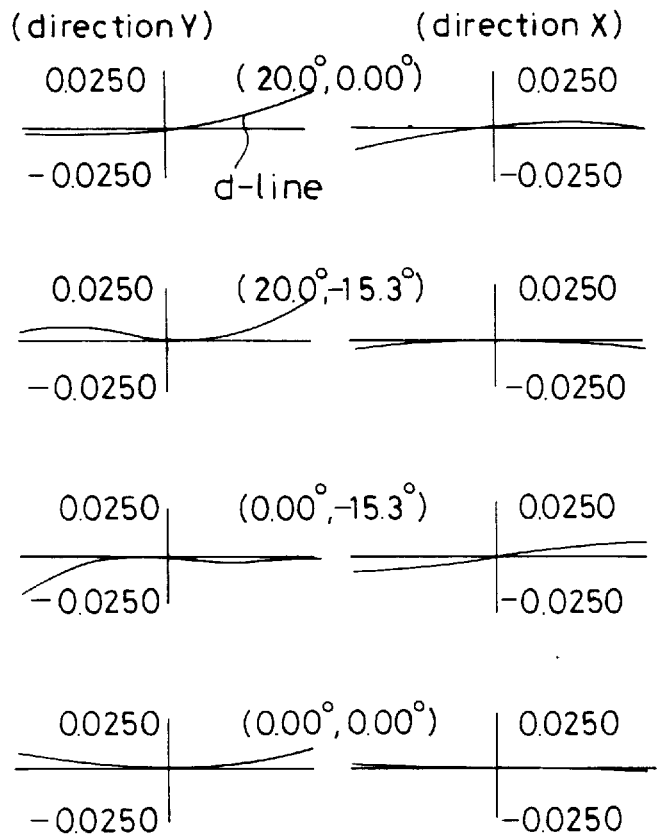
FIG. 9 is a part of an aberrational diagram illustrating lateral aberrations in the ocular optical system according to Example 2 of the present invention.
Figure 10:
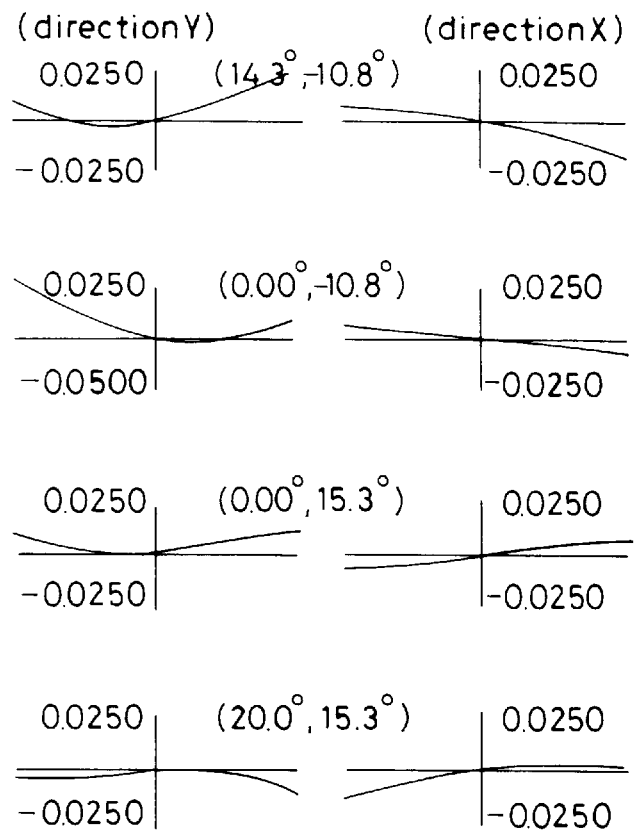
FIG. 10 is another part of the aberrational diagram illustrating lateral aberrations in the ocular optical system according to Example 2 of the present invention.
Figure 11:
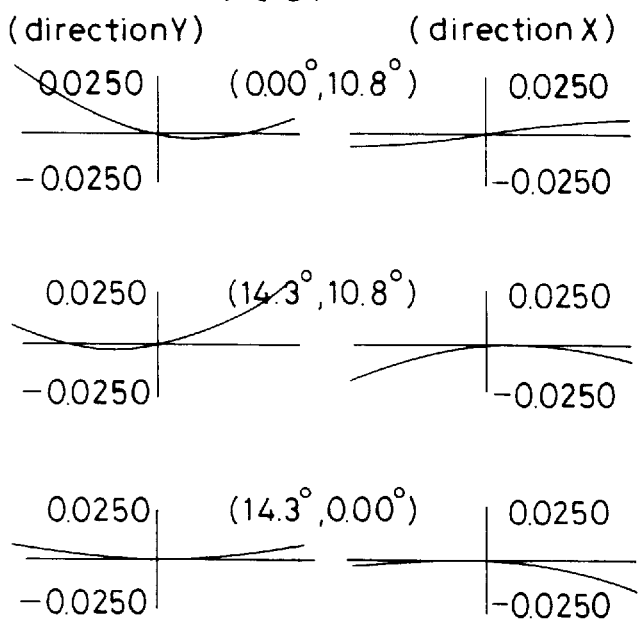
FIG. 11 is the other part of the aberrational diagram illustrating lateral aberrations in the ocular optical system according to Example 2 of the present invention.
Figure 12:
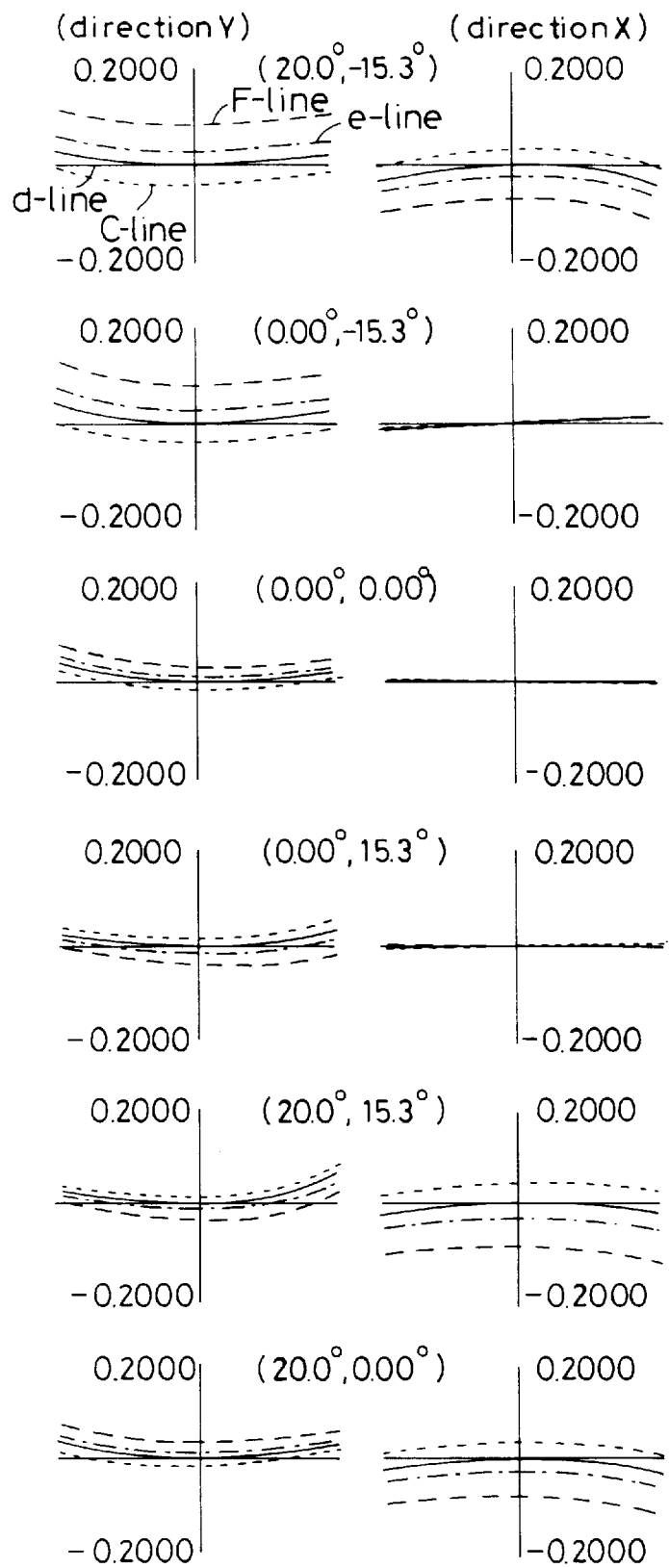
FIG. 12 is an aberrational diagram illustrating lateral aberrations in the ocular optical system according to Example 3 of the present invention.
Figure 13:
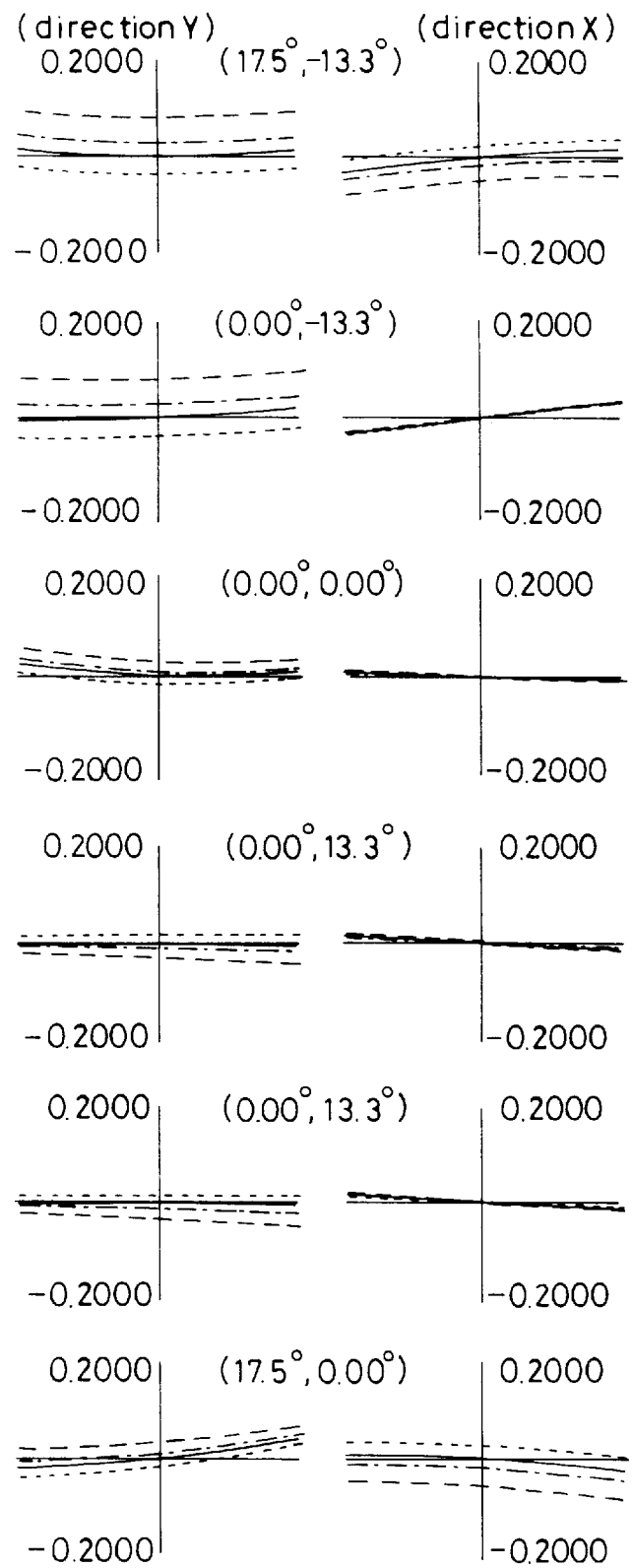
FIG. 13 is an aberrational diagram illustrating lateral aberrations in the ocular optical system according to Example 4 of the present invention.
Figure 14:
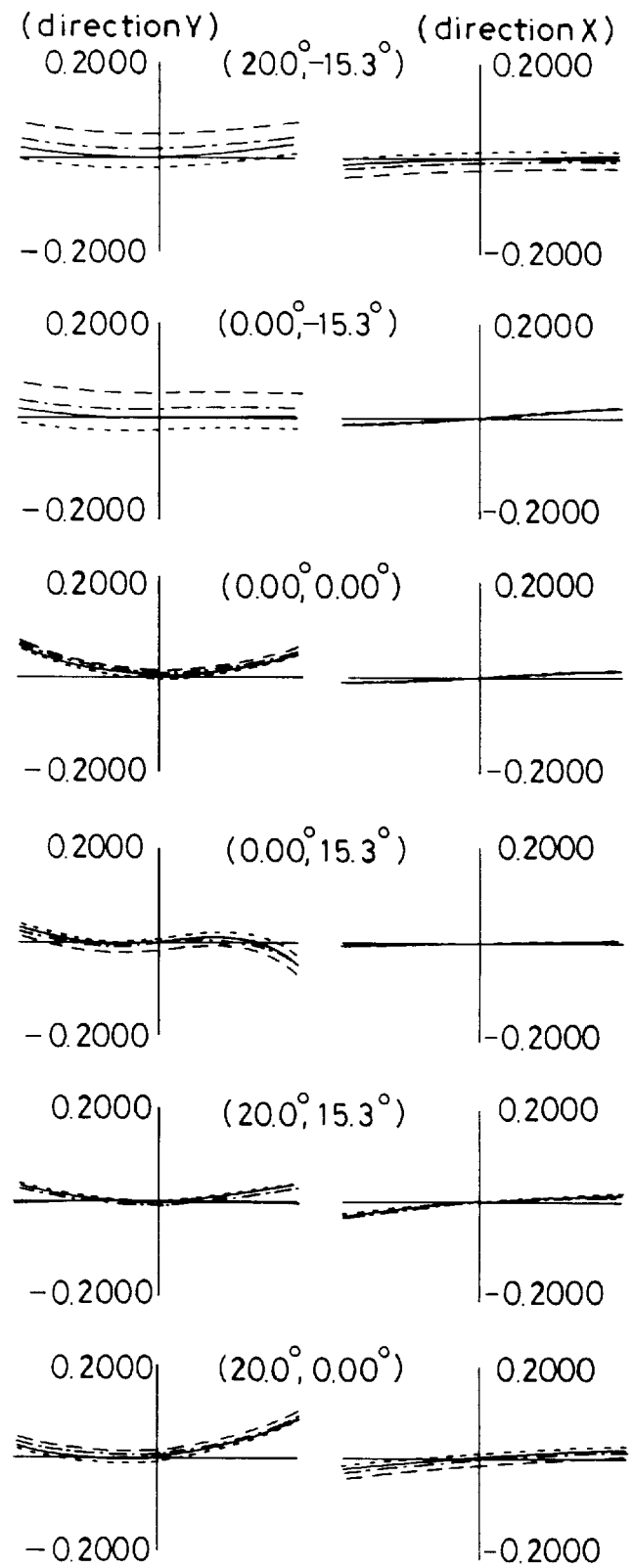
FIG. 14 is an aberrational diagram illustrating lateral aberrations in the ocular optical system according to Example 5 of the present invention.
Figure 15:
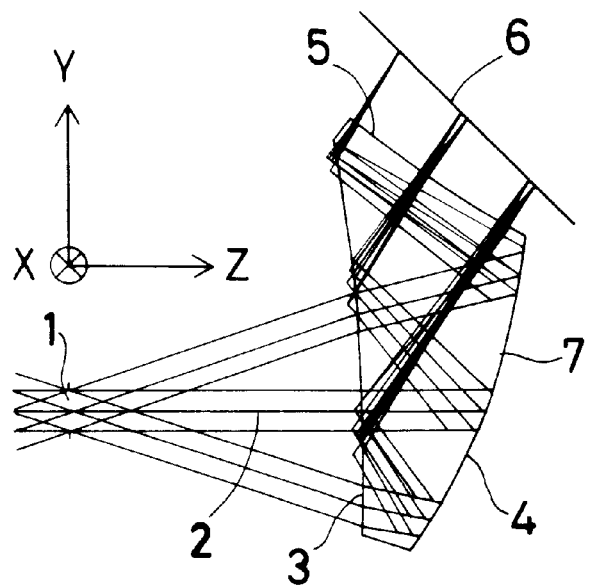
FIG. 15 is a sectional view showing one example of an ocular optical system to which the present invention can be applied.
Figure 16:
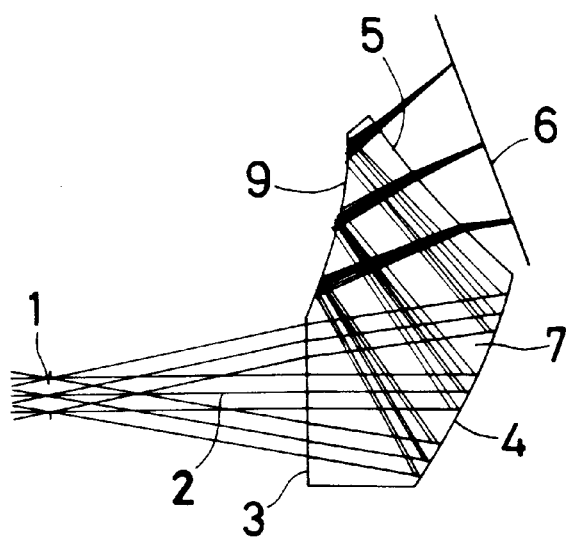
FIG. 16 is a sectional view showing another example of an ocular optical system to which the present invention can be applied.
Figure 17:
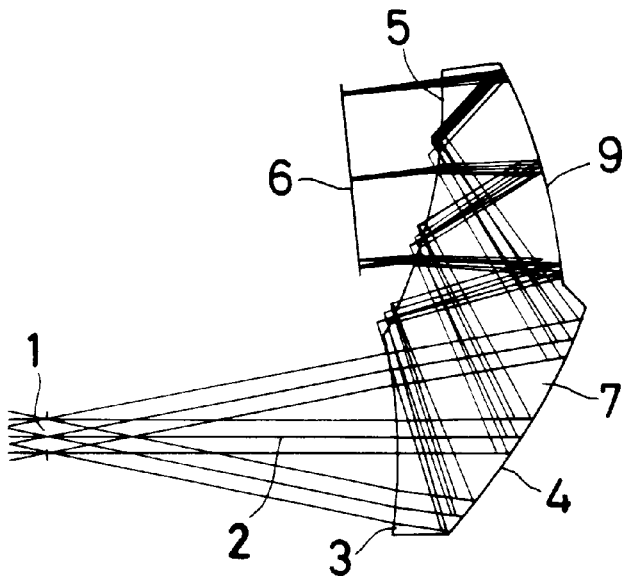
FIG. 17 is a sectional view showing another example of an ocular optical system to which the present invention can be applied.
Figure 18:
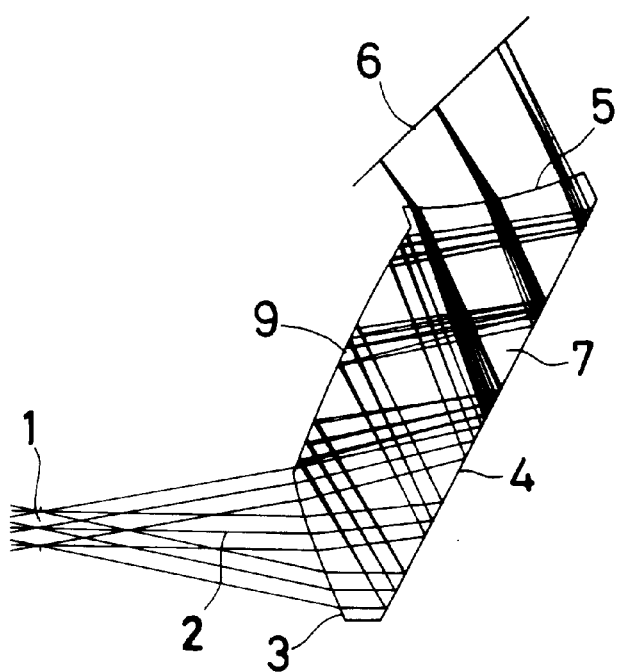
FIG. 18 is a sectional view showing another example of an ocular optical system to which the present invention can be applied.
Figure 19:
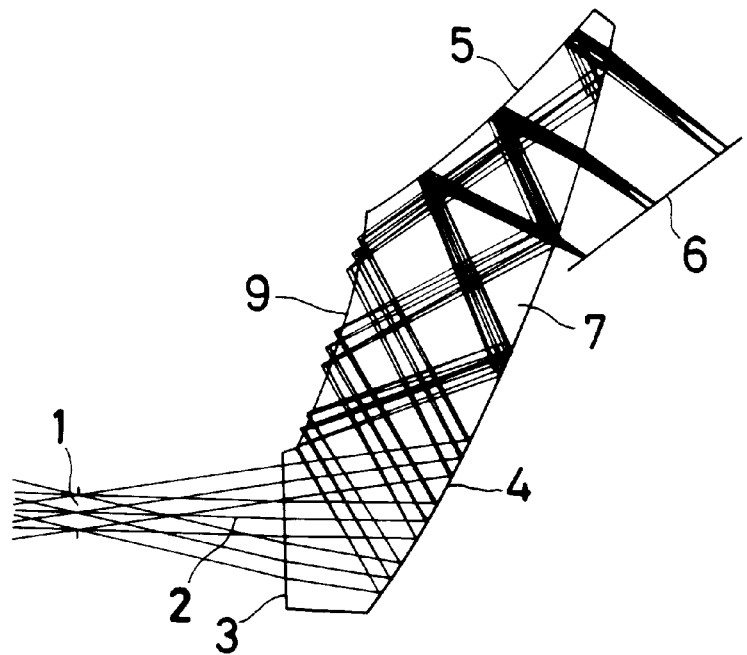
FIG. 19 is a sectional view showing another example of an ocular optical system to which the present invention can be applied.
Figure 20:
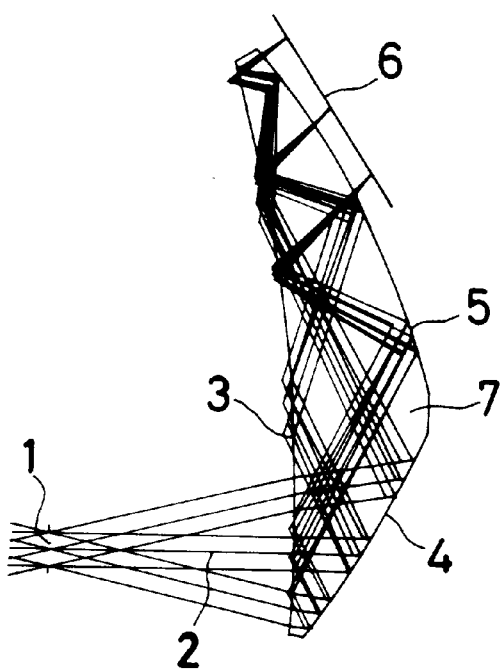
FIG. 20 is a sectional view showing another example of an ocular optical system to which the present invention can be applied.
Figure 21:
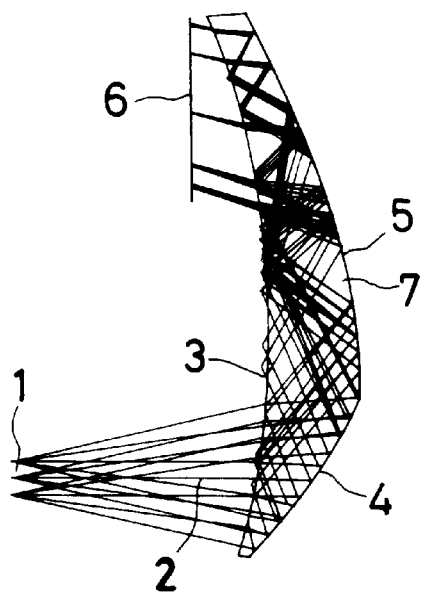
FIG. 21 is a sectional view showing another example of an ocular optical system to which the present invention can be applied.
Figure 22:
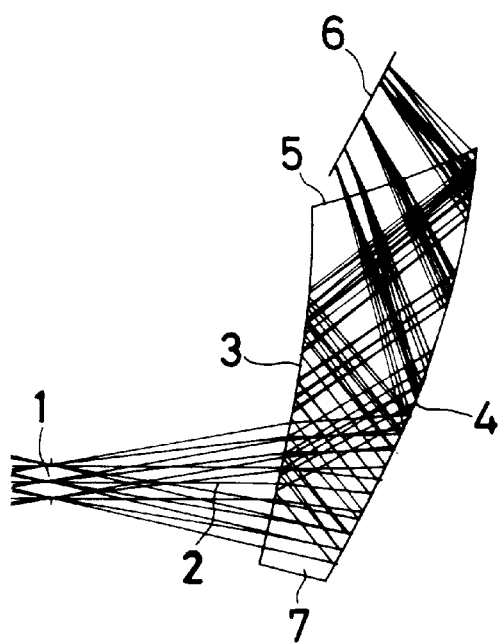
FIG. 22 is a sectional view showing another example of an ocular optical system to which the present invention can be applied.

In constituent parameters of each example (described later), as shown in FIG. 1, an exit pupil 1 of an ocular optical system 7 is defined as the origin of an optical system, and an optical axis 2 is defined by a light ray which emanates from the center of the display area of an image display device 6 and passes through the center (the origin) of the exit pupil 1. The Z-axis is taken in a direction in which light rays travel from the exit pupil 1 along the optical axis 2. The Y-axis is taken in a direction which extends through the center of the exit pupil 1 at right angles to the Z-axis in a plane in which light rays are bent by the ocular optical system 7. The X-axis is taken in a direction which extends through the center of the exit pupil 1 at right angles to both the Z- and Y-axes. The direction in which the Z-axis extends from the exit pupil 1 toward the ocular optical system 7 is defined as a positive direction of the Z-axis. The direction in which the Y-axis extends from the optical axis 2 toward the image display device 6 is defined as a positive direction of the Y-axis. The direction in which the X-axis constitutes a right-handed system in combination with the Z- and Y-axes is defined as a positive direction of the X-axis It should be noted that ray tracing is carried out by backward tracing from the exit pupil 1 of the ocular optical system 7, which is defined as the object side, toward the image display device 6, which is defined as the image surface side.

Regarding each surface for which eccentricities Y and Z and inclination θ are shown, the eccentricity Y is a distance by which the surface deviates in the Y-axis direction from the exit pupil 1, which is the origin of the optical system, while the eccentricity Z is a distance by which the surface deviates in the Z-axis direction from the exit pupil 1, and the amount of inclination θ is an angle of tilt with respect to the Z-axis. It should be noted that, for the tilt angle, the counterclockwise direction is defined as a positive direction. It should be noted that the surface separation in the constituent parameters is meaningless.

The configuration of an anamorphic surface is defined by the following equation. A straight line which passes through the origin of the surface configuration, and which is perpendicular to the optical surface is defined as the axis of the anamorphic surface.

$$Z = (CX \cdot x^2 + CY \cdot y^2) / \left[ 1 + \{1 - (1 + K_x)CX^2 \cdot x^2 - (1 + K_y)CY^2 \cdot y^2\}^{1/2} \right] + \sum_{n=2} R_n \{(1 - P_n)x^2 + (1 + P_n)y^2\}^n \quad \text{(b)}$$

where Z is the amount of deviation from a plane tangent to the origin of the surface configuration, CX is the curvature in the X-axis direction, CY is the curvature in the Y-axis direction, $K_x$ is the conical coefficient in the X-axis direction, $K_y$ is the conical coefficient in the Y-axis direction, $R_n$ is the rotationally symmetric component of the aspherical surface term, and $P_n$ is the rotationally asymmetric component of the aspherical surface term.

In constituent parameters (described later) in examples, the following parameters are employed:

$R_x$: the radius of curvature in the X-axis direction $R_y$: the radius of curvature in the Y-axis direction The curvature radii are related to the curvatures CX and CY as follows:

$R_x = 1/CX, R_y = 1/CY$

The configuration of a three-dimensional surface is defined by the following equation:

$$Z = C_2 \qquad (a)$$
$$+ C_3 y + C_4 x$$
$$+ C_5 y^2 + C_6 yx + C_7 x^2 +$$
$$+ C_8 y^3 + C_9 y^2 x + C_{10} yx^2 + C_{11} x^3$$
$$+ C_{12} y^4 + C_{13} y^3 x + C_{14} y^2 x^2 + C_{15} yx^3 + C_{16} x^4$$
$$+ C_{17} y^5 + C_{18} y^4 x + C_{19} y^3 x^2 + C_{20} y^2 x^3 + C_{21} yx^4 + C_{22} x^5$$
$$+ C_{23} y^6 + C_{24} y^5 x + C_{25} y^4 x^2 + C_{26} y^3 x^3 + C_{27} y^2 x^4 + C_{28} yx^5 + C_{29} x^6$$
$$+ C_{30} y^7 + C_{31} y^6 x + C_{32} y^5 x^2 + C_{33} y^4 x^3 + C_{34} y^3 x^4 + C_{35} y^2 x^5 + C_{36} yx^6 + C_{37} x^7$$
$$\ldots$$

The term concerning an aspherical surface for which no data is shown is 0. The refractive index is expressed by the refractive index for the spectral d-line (wavelength 587.56 nm). Lengths are given in millimeters.

The ocular optical system 7 in any of the following Examples 1 to 6 has three surfaces, i.e. a first surface 3, a second surface 4, and a third surface 5, and a space lying between these surfaces is filled with a medium having a refractive index larger than 1. Display light from an image display device 6 enters the optical system 7 through the third surface 5, which is a transparent surface disposed to face the image display device 6. The incident light is reflected by the first surface 3, which is disposed on the optical axis 2 between the second surface 4 and the exit pupil 1. Then, the reflected light is reflected by the second surface 4, which is a reflecting surface eccentrically disposed on the optical axis 2 to face the exit pupil 1. The reflected light exits from the optical system 7 through the first surface 3, travels along the optical axis 2, and enters the observer's pupil placed at the exit pupil 1, without forming an intermediate image, thus forming a display image on the retina of the observer's eye.

FIGS. 1 to 5 are sectional views of Examples 1 to 5, taken along the YZ-plane containing the optical axis 2. Illustration of Example 6 is omitted Constituent parameters in Examples 1 to 6 will be shown later. In Example 1, both the first and second surfaces 3 and 4 are anamorphic surfaces defined by the above equation (b), and the third surface 5 is a plane surface. In Examples 2 and 6, the first, second and third surfaces 3, 4 and 5 are all three-dimensional surfaces defined by the above equation (a). In Examples 3 and 4, the first surface 3 is a plane surface, and both the second and third surfaces 4 and 5 are three-dimensional surfaces defined by the equation (a). In Example 5, the first surface 3 is a spherical surface, and both the second and third surfaces 4 and 5 are three-dimensional surfaces defined by the equation (a). In Example 1, the horizontal field angle is 57.8°, the vertical field angle is 34.5°, and the pupil diameter is 4 millimeters. In Example 2, the horizontal field angle is 40°, the vertical field angle is 30.5°, and the pupil diameter is 8 millimeters. In Examples 3 and 5, the horizontal field angle is 40°, the vertical field angle is 30.5°, and the pupil diameter is 4 millimeters. In Example 4, the horizontal field angle is 35°, the vertical field angle is 26.6°, and the pupil diameter is 4 millimeters. In Example 6, the horizontal field angle is 30°, the vertical field angle is 22.7°, and the pupil diameter is 4 millimeters.

Constituent parameters in Examples 1 to 6 are as follows:

EXAMPLE 1

| Surface No. | Radius of curvature | Surface separation | Refractive index (Eccentricity) | Abbe's No. (Tilt angle) |
|---|---|---|---|---|
| 1 | ∞ (pupil) | | | |
| 2 (first surface) | $R_y$ −209.268 | | 1.4922 | 57.50 |
| | $R_x$ −95.115 | | (from pupil position) | |
| | $K_y$ 0 | | Y −18.335 | θ −12° |
| | $K_x$ 0 | | Z 27.921 | |
| | $R_2$ 7.8387 × 10$^{-7}$ | | | |
| | $R_3$ 2.9947 × 10$^{-13}$ | | | |
| | $R_4$ 1.5297 × 10$^{-14}$ | | | |
| | $R_5$ −5.0289 × 10$^{-17}$ | | | |
| | $P_2$ −0.4499 | | | |
| | $P_3$ −7.9471 | | | |
| | $P_4$ 0.6545 | | | |
| | $P_5$ −0.1387 | | | |
| 3 (second surface) (reflecting surface) | $R_y$ −67.801 | | 1.4922 | 57.50 |
| | $R_x$ −58.220 | | (from pupil position) | |
| | $K_y$ 0 | | Y 9.356 | θ 27.44° |
| | $K_x$ 0 | | Z 38.348 | |
| | $R_2$ 4.2705 × 10$^{-7}$ | | | |
| | $R_3$ −7.7029 × 10$^{-11}$ | | | |
| | $R_4$ 4.0793 × 10$^{-22}$ | | | |
| | $R_5$ 1.0591 × 10$^{-17}$ | | | |
| | $P_2$ 0.1070 | | | |
| | $P_3$ 0.4967 | | | |
| | $P_4$ 119.38 | | | |
| | $P_5$ −0.0092 | | | |

-continued

| Surface No. | Radius of curvature | Surface separation | Refractive index (Eccentricity) | Abbe's No. (Tilt angle) |
|---|---|---|---|---|
| 4 (first surface) (reflecting surface) | $R_y$ −209.268<br>$R_x$ −95.115<br>$K_y$ 0<br>$K_x$ 0<br>$R_2$ 7.8387 × 10$^{-7}$<br>$R_3$ 2.9947 × 10$^{-13}$<br>$R_4$ 1.5297 × 10$^{-14}$<br>$R_5$ −5.0289 × 10$^{-17}$<br>$P_2$ −0.4499<br>$P_3$ −7.9471<br>$P_4$ 0.6545<br>$P_5$ −0.1387 | | 1.4922<br>(from pupil position)<br>Y −18.335<br>Z 27.921 | 57.50<br><br>θ −12° |
| 5 (third surface) | ∞ | | (from pupil position)<br>Y −27.164<br>Z 27.921 | θ −62.56° |
| 6 (display plane) | ∞ | | (from pupil position)<br>Y −27.678<br>Z 39.000 | θ −46.89° |

EXAMPLE 2

| Surface No. | Radius of curvature | Surface separation | Refractive index (Eccentricity) | Abbe's No. (Tilt angle) |
|---|---|---|---|---|
| 1 | ∞ (pupil) | | | |
| 2 (first surface) | | Three-dimensional surface (1) | 1.5254<br>(from pupil position)<br>Y 13.983<br>Z 33.974 | 56.25<br><br>θ 9.46° |
| 3 (second surface) (reflecting surface) | | Three-dimensional surface (2) | 1.5254<br>(from pupil position)<br>Y 4.596<br>Z 49.231 | 56.25<br><br>θ −15.22° |
| 4 (first surface) (reflecting surface) | | Three-dimensional surface (1) | 1.5254<br>(from pupil position)<br>Y 13.983<br>Z 33.974 | 56.25<br><br>θ 9.46° |
| 5 (third surface) | | Three-dimensional surface (3) | (from pupil position)<br>Y 27.094<br>Z 35.215 | θ 79.39° |
| 6 (display plane) | ∞ | | (from pupil position)<br>Y 29.266<br>Z 46.318 | θ 46.34° |

Three-dimensional surface (1)

| | | | | | |
|---|---|---|---|---|---|
| $C_5$ | −2.6152 × 10$^{-3}$ | $C_7$ | −3.9706 × 10$^{-3}$ | $C_8$ | −7.5434 × 10$^{-5}$ |
| $C_{10}$ | −1.5120 × 10$^{-6}$ | $C_{12}$ | 2.6572 × 10$^{-7}$ | $C_{14}$ | 1.3359 × 10$^{-6}$ |
| $C_{16}$ | 1.7946 × 10$^{-7}$ | $C_{17}$ | −2.9881 × 10$^{-9}$ | $C_{19}$ | −3.0362 × 10$^{-9}$ |
| $C_{21}$ | −2.0258 × 10$^{-7}$ | $C_{23}$ | −3.8978 × 10$^{-10}$ | $C_{25}$ | 1.4986 × 10$^{-9}$ |
| $C_{27}$ | −3.8974 × 10$^{-9}$ | $C_{29}$ | −2.5335 × 10$^{-9}$ | $C_{30}$ | 4.3101 × 10$^{-12}$ |
| $C_{32}$ | −1.4923 × 10$^{-11}$ | $C_{34}$ | 7.6026 × 10$^{-11}$ | $C_{36}$ | −4.2410 × 10$^{-11}$ |

Three-dimensional surface (2)

| | | | | | |
|---|---|---|---|---|---|
| $C_5$ | −6.2524 × 10$^{-3}$ | $C_7$ | −7.5944 × 10$^{-3}$ | $C_8$ | −1.0605 × 10$^{-5}$ |
| $C_{10}$ | 9.3276 × 10$^{-6}$ | $C_{12}$ | 8.3882 × 10$^{-7}$ | $C_{14}$ | −5.6861 × 10$^{-7}$ |
| $C_{16}$ | −4.9904 × 10$^{-7}$ | $C_{17}$ | −2.0403 × 10$^{-10}$ | $C_{19}$ | −8.0184 × 10$^{-9}$ |
| $C_{21}$ | −4.4196 × 10$^{-8}$ | $C_{23}$ | 4.4149 × 10$^{-10}$ | $C_{25}$ | 3.8170 × 10$^{-10}$ |
| $C_{27}$ | 8.4970 × 10$^{-11}$ | $C_{29}$ | −2.8006 × 10$^{-10}$ | $C_{30}$ | 1.3964 × 10$^{-12}$ |
| $C_{32}$ | 1.7677 × 10$^{-10}$ | $C_{34}$ | 3.3220 × 10$^{-12}$ | $C_{36}$ | 6.9401 × 10$^{-12}$ |

Three-dimensional surface (3)

| | | | | | |
|---|---|---|---|---|---|
| $C_5$ | −1.2118 × 10$^{-2}$ | $C_7$ | −3.7062 × 10$^{-3}$ | $C_8$ | −1.2290 × 10$^{-4}$ |
| $C_{10}$ | 9.9763 × 10$^{-4}$ | $C_{12}$ | −8.0746 × 10$^{-5}$ | $C_{14}$ | −3.8939 × 10$^{-5}$ |
| $C_{16}$ | 2.6861 × 10$^{-5}$ | $C_{17}$ | −1.7720 × 10$^{-6}$ | $C_{19}$ | −3.4243 × 10$^{-6}$ |
| $C_{21}$ | −3.5310 × 10$^{-7}$ | $C_{23}$ | 1.2185 × 10$^{-7}$ | $C_{25}$ | 1.0019 × 10$^{-7}$ |
| $C_{27}$ | 1.4838 × 10$^{-7}$ | $C_{29}$ | −5.3531 × 10$^{-8}$ | | |

EXAMPLE 3

| Surface No. | Radius of curvature | Surface separation | Refractive index (Eccentricity) | Abbe's No. (Tilt angle) |
|---|---|---|---|---|
| 1 | ∞ (pupil) | | | |
| 2 (first surface) | ∞ | | 1.5254 (from pupil position) Y 0.000 Z 37.527 | 56.25 θ 20.65° |
| 3 (second surface) (reflecting surface) | Three-dimensional surface (1) | | 1.5254 (from pupil position) Y 1.760 Z 49.700 | 56.25 θ −9.37° |
| 4 (first surface) (reflecting surface) | ∞ | | 1.5254 (from pupil position) Y 0.000 Z 37.527 | 56.25 θ 20.65° |
| 5 (third surface) | Three dimensional surface (2) | | (from pupil position) Y 25.997 Z 46.184 | θ 74.58° |
| 6 (display plane) | ∞ | | (from pupil position) Y 33.670 Z 45.021 | θ 51.85° |

Three-dimensional surface (1)

| | | | | | |
|---|---|---|---|---|---|
| $C_5$ | $-4.5817 \times 10^{-3}$ | $C_7$ | $-5.0260 \times 10^{-3}$ | $C_8$ | $-3.2015 \times 10^{-5}$ |
| $C_{10}$ | $2.2441 \times 10^{-5}$ | $C_{12}$ | $-1.8792 \times 10^{-7}$ | $C_{14}$ | $7.9815 \times 10^{-7}$ |
| $C_{16}$ | $5.0435 \times 10^{-7}$ | $C_{17}$ | $-6.8674 \times 10^{-8}$ | $C_{19}$ | $1.0002 \times 10^{-8}$ |
| $C_{21}$ | $-6.6719 \times 10^{-9}$ | $C_{23}$ | $1.3063 \times 10^{-9}$ | $C_{25}$ | $-2.2955 \times 10^{-9}$ |
| $C_{27}$ | $-1.9103 \times 10^{-10}$ | $C_{29}$ | $-6.8281 \times 10^{-10}$ | $C_{30}$ | $1.3784 \times 10^{-10}$ |
| $C_{32}$ | $-1.0577 \times 10^{-10}$ | $C_{34}$ | $2.8101 \times 10^{-11}$ | $C_{36}$ | $1.2847 \times 10^{-11}$ |

Three-dimensional surface (2)

| | | | | | |
|---|---|---|---|---|---|
| $C_5$ | $4.2493 \times 10^{-4}$ | $C_7$ | $-2.0055 \times 10^{-2}$ | $C_8$ | $-1.1201 \times 10^{-3}$ |
| $C_{10}$ | $1.5646 \times 10^{-4}$ | $C_{12}$ | $-1.0605 \times 10^{-4}$ | $C_{14}$ | $4.3806 \times 10^{-5}$ |
| $C_{16}$ | $2.6464 \times 10^{-5}$ | $C_{17}$ | $2.1338 \times 10^{-5}$ | $C_{19}$ | $-8.0966 \times 10^{-7}$ |
| $C_{21}$ | $-1.4461 \times 10^{-6}$ | $C_{23}$ | $-1.0841 \times 10^{-6}$ | $C_{25}$ | $-1.2023 \times 10^{-7}$ |
| $C_{27}$ | $-1.6090 \times 10^{-8}$ | $C_{29}$ | $-5.5701 \times 10^{-9}$ | $C_{30}$ | $1.8180 \times 10^{-8}$ |
| $C_{32}$ | $5.1816 \times 10^{-9}$ | $C_{34}$ | $1.0613 \times 10^{-9}$ | $C_{36}$ | $6.6826 \times 10^{-10}$ |

EXAMPLE 4

| Surface No. | Radius of curvature | Surface separation | Refractive index (Eccentricity) | Abbe's No. (Tilt angle) |
|---|---|---|---|---|
| 1 | ∞ (pupil) | | | |
| 2 (first surface) | ∞ | | 1.5254 (from pupil position) Y 0.000 Z 39.619 | 56.25 θ 22.10° |
| 3 (second surface) (reflecting surface) | Three-dimensional surface (1) | | 1.5254 (from pupil position) Y −8.143 Z 50.124 | 56.25 θ −13.23° |
| 4 (first surface) (reflecting surface) | ∞ | | 1.5254 (from pupil position) Y 0.000 Z 39.619 | 56.25 θ 22.10° |
| 5 (third surface) | Three-dimensional surface (2) | | (from pupil position) Y 25.826 Z 51.879 | θ 92.97° |
| 6 (display plane) | ∞ | | (from pupil position) Y 35.497 Z 48.576 | θ 50.34° |

-continued

Three-dimensional surface (1)

| | | | | | |
|---|---|---|---|---|---|
| $C_5$ | $-4.6506 \times 10^{-3}$ | $C_7$ | $-4.7935 \times 10^{-3}$ | $C_8$ | $2.6669 \times 10^{-6}$ |
| $C_{10}$ | $1.6974 \times 10^{-5}$ | $C_{12}$ | $5.4534 \times 10^{-7}$ | $C_{14}$ | $-4.6491 \times 10^{-7}$ |
| $C_{16}$ | $-3.5840 \times 10^{-7}$ | $C_{17}$ | $1.8802 \times 10^{-8}$ | $C_{19}$ | $4.4645 \times 10^{-8}$ |
| $C_{21}$ | $-7.6909 \times 10^{-9}$ | $C_{23}$ | $-1.5994 \times 10^{-9}$ | $C_{25}$ | $-5.2799 \times 10^{-11}$ |
| $C_{27}$ | $1.1706 \times 10^{-9}$ | $C_{29}$ | $1.3813 \times 10^{-11}$ | $C_{30}$ | $2.9144 \times 10^{-11}$ |
| $C_{32}$ | $-4.6116 \times 10^{-11}$ | $C_{34}$ | $-5.5362 \times 10^{-11}$ | $C_{36}$ | $4.7568 \times 10^{-12}$ |

Three-dimensional surface (2)

| | | | | | |
|---|---|---|---|---|---|
| $C_5$ | $1.9719 \times 10^{-2}$ | $C_7$ | $-7.7622 \times 10^{-3}$ | $C_8$ | $2.3734 \times 10^{-5}$ |
| $C_{10}$ | $-5.0317 \times 10^{-4}$ | $C_{12}$ | $-2.0110 \times 10^{-4}$ | $C_{14}$ | $6.3593 \times 10^{-5}$ |
| $C_{16}$ | $4.5581 \times 10^{-5}$ | $C_{17}$ | $1.6122 \times 10^{-5}$ | $C_{19}$ | $-1.3368 \times 10^{-6}$ |
| $C_{21}$ | $-3.0966 \times 10^{-6}$ | $C_{23}$ | $-5.2286 \times 10^{-7}$ | $C_{25}$ | $-6.5949 \times 10^{-8}$ |
| $C_{27}$ | $5.9680 \times 10^{-9}$ | $C_{29}$ | $-2.7181 \times 10^{-8}$ | $C_{30}$ | $6.2758 \times 10^{-9}$ |
| $C_{32}$ | $2.4299 \times 10^{-9}$ | $C_{34}$ | $2.2116 \times 10^{-9}$ | $C_{36}$ | $2.0886 \times 10^{-9}$ |

EXAMPLE 5

| Surface No. | Radius of curvature | Surface separation | Refractive index (Eccentricity) | Abbe's No. (Tilt angle) |
|---|---|---|---|---|
| 1 | ∞ (pupil) | | | |
| 2 (first surface) | −87.879 | | 1.5254 (from pupil position) Y 0.000 Z 38.369 | 56.25 θ 4.83° |

-continued

| | | | | |
|---|---|---|---|---|
| 3 | Three-dimensional surface (1) | 1.5254 | 56.25 | |
| (second surface) (reflecting surface) | | (from pupil position) Y −3.704 θ −23.79° Z 46.813 | | |
| 4 (first surface) (reflecting surface) | −87.879 | 1.5254 (from pupil position) Y 0.000 θ 4.83° Z 38.369 | 56.25 | |
| 5 (third surface) | Three-dimensional surface (2) | (from pupil position) Y 19.042 θ 46.94° Z 47.204 | | |

-continued

| | | | | |
|---|---|---|---|---|
| 6 (display plane) | ∞ | (from pupil position) Y 27.507 θ 55.57° Z 45.930 | | |

Three-dimensional surface (1)

| | | | | | |
|---|---|---|---|---|---|
| $C_5$ | $-9.8620 \times 10^{-3}$ | $C_7$ | $-9.1521 \times 10^{-3}$ | $C_8$ | $6.2235 \times 10^{-5}$ |
| $C_{10}$ | $8.0917 \times 10^{-6}$ | $C_{12}$ | $9.2182 \times 10^{-7}$ | $C_{14}$ | $-1.5968 \times 10^{-6}$ |
| $C_{16}$ | $-1.1413 \times 10^{-6}$ | $C_{17}$ | $-9.8234 \times 10^{-8}$ | $C_{19}$ | $1.3883 \times 10^{-8}$ |
| $C_{21}$ | $1.1992 \times 10^{-8}$ | $C_{23}$ | $-1.0379 \times 10^{-8}$ | $C_{25}$ | $-5.0580 \times 10^{-9}$ |
| $C_{27}$ | $-2.3570 \times 10^{-9}$ | $C_{29}$ | $-1.5443 \times 10^{-10}$ | $C_{30}$ | $4.6063 \times 10^{-10}$ |
| $C_{32}$ | $1.4306 \times 10^{-10}$ | $C_{34}$ | $5.9077 \times 10^{-11}$ | $C_{36}$ | $1.5553 \times 10^{-12}$ |

Three-dimensional surface (2)

| | | | | | |
|---|---|---|---|---|---|
| $C_5$ | $-3.4909 \times 10^{-3}$ | $C_7$ | $-1.8708 \times 10^{-3}$ | $C_8$ | $-7.3195 \times 10^{-5}$ |
| $C_{10}$ | $1.7538 \times 10^{-4}$ | $C_{12}$ | $-5.3578 \times 10^{-4}$ | $C_{14}$ | $1.1140 \times 10^{-4}$ |
| $C_{16}$ | $4.0203 \times 10^{-5}$ | $C_{17}$ | $-3.3457 \times 10^{-6}$ | $C_{19}$ | $-4.3054 \times 10^{-6}$ |
| $C_{21}$ | $8.6126 \times 10^{-6}$ | $C_{23}$ | $6.3802 \times 10^{-6}$ | $C_{25}$ | $-2.1983 \times 10^{-7}$ |
| $C_{27}$ | $-2.7202 \times 10^{-7}$ | $C_{29}$ | $-1.5211 \times 10^{-8}$ | $C_{30}$ | $-2.8038 \times 10^{-7}$ |
| $C_{32}$ | $1.8870 \times 10^{-8}$ | $C_{34}$ | $3.0331 \times 10^{-8}$ | $C_{36}$ | $-2.9737 \times 10^{-8}$ |

EXAMPLE 6

| Surface No. | Radius of curvature | Surface separation | Refractive index (Eccentricity) | Abbe's No. (Tilt angle) |
|---|---|---|---|---|
| 1 | ∞ (pupil) | | | |
| 2 (first surface) | Three-dimensional surface (1) | | 1.5254 (from pupil position) Y 15.357 θ 10.74° Z 34.182 | 56.25 |
| 3 (second surface) (reflecting surface) | Three-dimensional surface (2) | | 1.5254 (from pupil position) Y 4.623 θ −14.41° Z 48.756 | 56.25 |
| 4 (first surface) (reflecting surface) | Three-dimensional surface (1) | | 1.5254 (from pupil position) Y 15.357 θ 10.74° Z 34.182 | 56.25 |
| 5 (third surface) | Three-dimensional surface (3) | | (from pupil position) Y 23.976 θ 85.37° Z 33.488 | |
| 6 (display plane) | ∞ | | (from pupil position) Y 27.358 θ 48.46° Z 47.424 | |

Three-dimensional surface (1)

| | | | | | |
|---|---|---|---|---|---|
| $C_5$ | $-2.4758 \times 10^{-3}$ | $C_7$ | $-3.5372 \times 10^{-3}$ | $C_8$ | $-7.6620 \times 10^{-5}$ |
| $C_{10}$ | $-8.3381 \times 10^{-6}$ | $C_{12}$ | $2.9731 \times 10^{-7}$ | $C_{14}$ | $2.4124 \times 10^{-6}$ |
| $C_{16}$ | $-5.9667 \times 10^{-7}$ | $C_{17}$ | $-4.2239 \times 10^{-9}$ | $C_{19}$ | $-5.3293 \times 10^{-9}$ |
| $C_{21}$ | $-2.4346 \times 10^{-7}$ | $C_{23}$ | $-3.4681 \times 10^{-10}$ | $C_{25}$ | $1.7047 \times 10^{-9}$ |
| $C_{27}$ | $-2.5200 \times 10^{-9}$ | $C_{29}$ | $-1.0197 \times 10^{-9}$ | $C_{30}$ | $3.2736 \times 10^{-12}$ |
| $C_{32}$ | $-4.3072 \times 10^{-12}$ | $C_{34}$ | $2.8466 \times 10^{-10}$ | $C_{36}$ | $-1.7915 \times 10^{-10}$ |

Three-dimensional surface (2)

| | | | | | |
|---|---|---|---|---|---|
| $C_5$ | $-5.8831 \times 10^{-3}$ | $C_7$ | $-7.4964 \times 10^{-3}$ | $C_8$ | $-1.1174 \times 10^{-6}$ |
| $C_{10}$ | $1.6694 \times 10^{-5}$ | $C_{12}$ | $1.4260 \times 10^{-6}$ | $C_{14}$ | $3.3095 \times 10^{-7}$ |
| $C_{16}$ | $-6.0142 \times 10^{-7}$ | $C_{17}$ | $-4.4144 \times 10^{-9}$ | $C_{19}$ | $-3.6906 \times 10^{-8}$ |
| $C_{21}$ | $-6.2579 \times 10^{-8}$ | $C_{23}$ | $1.2187 \times 10^{-9}$ | $C_{25}$ | $1.6218 \times 10^{-9}$ |
| $C_{27}$ | $5.1434 \times 10^{-10}$ | $C_{29}$ | $1.4918 \times 10^{-9}$ | $C_{30}$ | $-1.9592 \times 10^{-12}$ |
| $C_{32}$ | $-2.2611 \times 10^{-10}$ | $C_{34}$ | $9.7506 \times 10^{-11}$ | $C_{36}$ | $3.4526 \times 10^{-11}$ |

Three-dimensional surface (3)

| | | | | | |
|---|---|---|---|---|---|
| $C_5$ | $-2.4758 \times 10^{-3}$ | $C_7$ | $-3.5372 \times 10^{-3}$ | $C_8$ | $-7.8662 \times 10^{-5}$ |
| $C_{10}$ | $-8.3381 \times 10^{-6}$ | $C_{12}$ | $2.9731 \times 10^{-7}$ | $C_{14}$ | $2.4124 \times 10^{-6}$ |
| $C_{16}$ | $-5.9667 \times 10^{-7}$ | $C_{17}$ | $-4.2239 \times 10^{-9}$ | $C_{19}$ | $-5.3293 \times 10^{-9}$ |
| $C_{21}$ | $-2.4346 \times 10^{-7}$ | $C_{23}$ | $-3.4681 \times 10^{-10}$ | $C_{25}$ | $1.7047 \times 10^{-9}$ |

-continued

| | | | | | |
|---|---|---|---|---|---|
| $C_{27}$ | $-2.5200 \times 10^{-9}$ | $C_{29}$ | $-1.0197 \times 10^{-9}$ | $C_{30}$ | $3.2736 \times 10^{-12}$ |
| $C_{32}$ | $-4.3072 \times 10^{-12}$ | $C_{34}$ | $2.8466 \times 10^{-10}$ | $C_{36}$ | $-1.7915 \times 10^{-10}$ |

Lateral aberrations in Examples 1, 2, 3, 4 and 5 are graphically shown in FIGS. 6 to 8, FIGS. 9 to 11, FIG. 12, FIG. 13, and FIG. 14, respectively. In these aberrational diagrams, the parenthesized numerals in parentheses denote (horizontal (X-direction) field angle, vertical (Y-direction) field angle), and lateral aberrations at the field angles are shown.

Values of parameters concerning the conditions (1-1) to (32-1) in each example of the present invention are shown below [regarding the conditions (1) and (2), reflective refracting powers of the reflecting surfaces are shown; regarding the conditions (22-1) and (22-2), actual values are shown; and regarding the conditions for which values are shown in a pair of upper and lower rows, minimum values are shown in the upper row, and maximum values are shown in the lower row].

| | Ex. 1 | Ex. 2 | Ex. 3 | Ex. 4 | Ex. 5 | Ex. 6 |
|---|---|---|---|---|---|---|
| (1) | 0.0526 | 0.0466 | 0.0315 | 0.0283 | 0.0558 | 0.0461 |
| | -0.0317 | -0.0242 | 0 | 0 | -0.0349 | -0.0214 |
| (2) | 0.0432 | 0.0366 | 0.0307 | 0.0255 | 0.0548 | 0.0347 |
| | -0.0132 | -0.0127 | 0 | 0 | -0.0347 | -0.0117 |
| (1-1) | -0.373 | -0.115 | -0.017 | -0.180 | -0.210 | -0.061 |
| | 0.050 | 0.180 | 0.158 | 0.027 | 0.105 | 0.160 |
| (2-1) | -0.003 | -0.000 | -0.003 | -0.004 | -0.002 | 0.002 |
| | 0.041 | 0.017 | 0.142 | -0.000 | 0.004 | 0.025 |
| (3-1) | 0.044 | -0.012 | -0.146 | 0.004 | 0.006 | 0.006 |
| (4-1) | -0.207 | -0.129 | -0.080 | -0.117 | -0.154 | -0.076 |
| | 0.217 | 0.166 | 0.095 | 0.090 | 0.131 | 0.120 |
| (5-1) | 0.012 | -0.001 | -0.002 | -0.004 | 0.001 | -0.0001 |
| (6-1) | -0.037 | -0.017 | 0.008 | 0.013 | -0.003 | -0.017 |
| (7-1) | 0.004 | -0.017 | 0.008 | 0.013 | -0.005 | -0.044 |
| (8-1) | -0.0026 | -0.0032 | -0.0002 | -0.0008 | 0.0000 | -0.0031 |
| (9-1) | -0.0061 | -0.0038 | -0.0002 | -0.0008 | 0.0002 | -0.0037 |
| (10-1) | -0.0237 | -0.0184 | -0.0105 | -0.0106 | -0.0238 | -0.0113 |
| | -0.0172 | -0.0151 | -0.0095 | -0.0088 | -0.0183 | -0.0021 |
| (11-1) | -0.0193 | -0.0131 | -0.0106 | -0.0095 | -0.0277 | -0.0153 |
| | -0.0147 | -0.0032 | -0.0086 | -0.0068 | -0.0175 | -0.0131 |
| (12-1) | 0.0048 | 0.0001 | -0.0005 | 0.0007 | 0.0043 | -0.0008 |
| | 0.0057 | 0.0033 | -0.0001 | 0.0009 | 0.0055 | 0.0005 |
| (13-1) | 0.0010 | -0.0045 | -0.0002 | -0.0001 | 0.0012 | -0.0050 |
| | 0.0036 | 0.0009 | 0 | 0.0013 | 0.0037 | 0 |
| (14-1) | -0.0017 | -0.0031 | 0.0006 | 0.0008 | -0.0010 | -0.0027 |
| | 0.0008 | 0.0001 | 0.0009 | 0.0009 | -0.0005 | -0.0002 |
| (15-1) | -0.0036 | -0.0100 | 0.0018 | 0.0014 | 0.0065 | -0.0144 |
| | -0.0699 | -0.0045 | 0.0018 | 0.0025 | 0.0089 | -0.0092 |
| (16-1) | -0.0084 | -0.0121 | -0.0011 | -0.0021 | -0.0061 | -0.0160 |
| | -0.0024 | 0.0024 | 0.0002 | -0.0004 | 0.0052 | 0.0009 |
| (17-1) | -0.0064 | -0.0121 | -0.0011 | -0.0021 | -0.0061 | -0.0160 |
| | -0.0024 | -0.0029 | 0.0002 | -0.0004 | 0.0052 | -0.0035 |
| (18-1) | 0.6028 | 0.5181 | — | — | 0.6260 | 0.4632 |
| (19-1) | 0.2960 | 0.3453 | — | — | 0.6391 | 0.3409 |
| (20-1) | 2.3905 | 1.9025 | — | — | 0.9872 | 1.8270 |
| (21-1) | 1.1738 | 1.2678 | 1.0157 | 1.0937 | 1.0078 | 1.3445 |
| (22-1) | -0.0172 | -0.0153 | -0.0103 | -0.0093 | -0.0183 | -0.0151 |
| (22-2) | -0.0142 | -0.0120 | -0.0101 | -0.0084 | -0.0180 | -0.0114 |
| (23-1) | 1.2173 | 1.2729 | 1.0250 | 1.1070 | 1.0178 | 1.3270 |
| (24-1) | -0.0024 | -0.0076 | -0.0010 | -0.0010 | -0.0025 | -0.0043 |
| | 0.0042 | 0.0045 | -0.0002 | 0.0004 | -0.0005 | 0.0047 |
| (25-1) | -0.0008 | -0.0014 | -0.0010 | -0.0010 | -0.0025 | 0.0603 |
| | 0.0001 | 0.0013 | -0.0002 | 0.0004 | -0.0005 | 0.0017 |
| (26-1) | -0.0017 | -0.0057 | -0.0002 | -0.0011 | -0.0047 | -0.0060 |
| | 0.0016 | 0.0089 | 0.0015 | 0.0019 | 0.0030 | 0.0091 |
| (27-1) | -0.0017 | -0.0009 | -0.0002 | -0.0011 | -0.0047 | 0.0001 |
| | 0.0008 | 0.0089 | 0.0015 | 0.0019 | 0.0030 | 0.0068 |
| (28-1) | 3.2990 | 4.5629 | 1.1298 | 1.3716 | 1.3234 | 2.9359 |
| (29-1) | 1.3465 | 4.5629 | 1.1298 | 1.3716 | 1.3234 | 2.9359 |
| (30-1) | 0.6028 | 0.5181 | 0 | 0 | 0.6260 | 0.4638 |
| (31-1) | 0.3065 | 0.3466 | 0 | 0 | 0.6331 | 0.3368 |
| (32-1) | 2.3940 | 1.9028 | — | — | 1.0065 | 1.8273 |

Although the ocular optical systems in the above examples are formed by using three-dimensional surfaces defined by the equation (a) and anamorphic surfaces defined by the equation (b), curved surfaces defined by any defining equation can be used in the present invention. No matter which defining equation is used, an ocular optical system which is considerably favorably corrected for aberrations can be obtained by satisfying any or some of the conditions shown in the present invention. It should be noted that conditional expressions which are used in conventional non-decentered systems, e.g. those for the curvature of a surface defined on the basis of the center of a coordinate system for defining a surface in which decentration is ignored, and those for the focal length of a surface, are meaningless in a case where each surface is decentered to a considerable extent as in the present invention.

Figure 23:
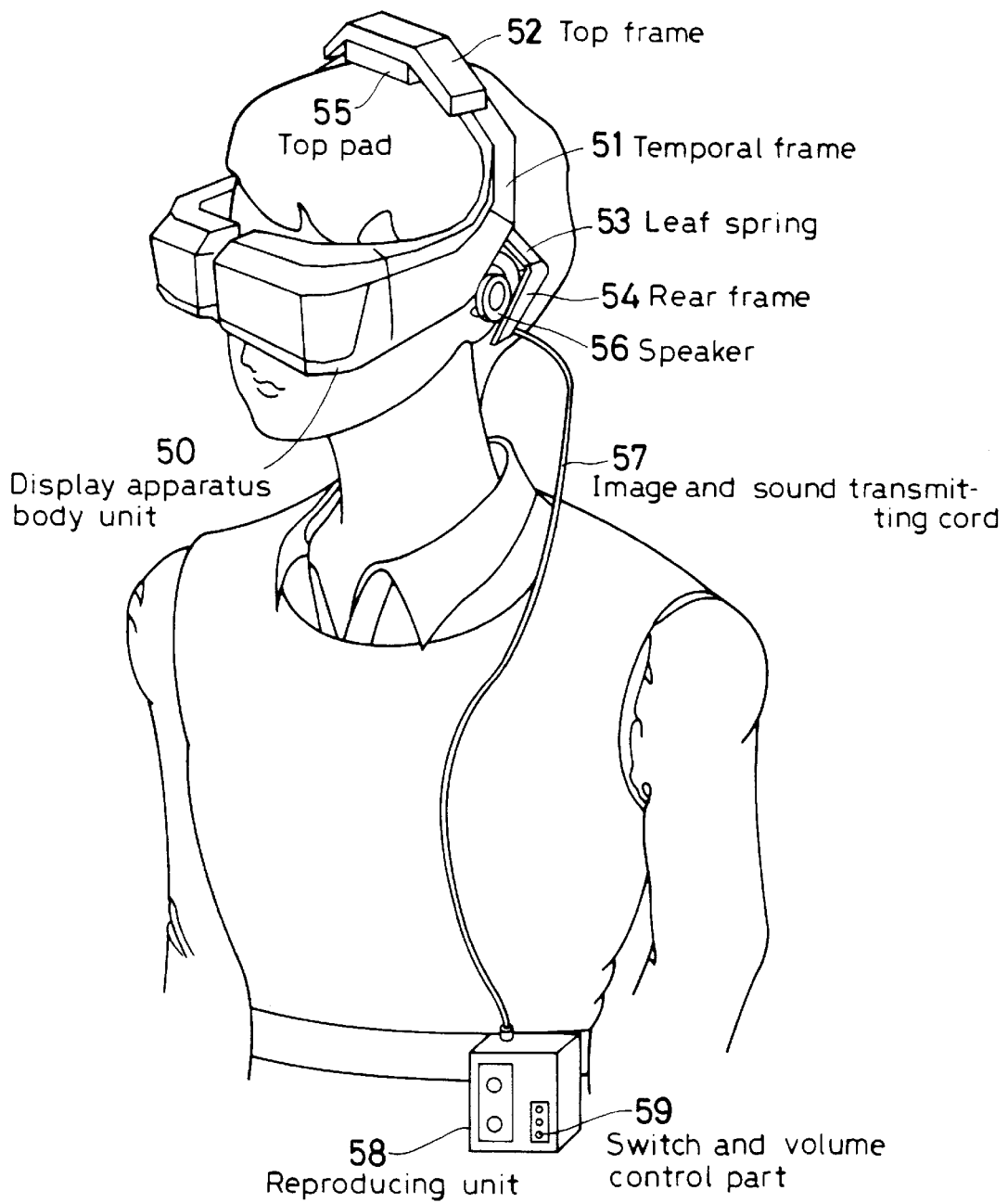
FIG. 23 shows the whole arrangement of one example of a head-mounted image display apparatus according to the present invention.
Figure 24A:
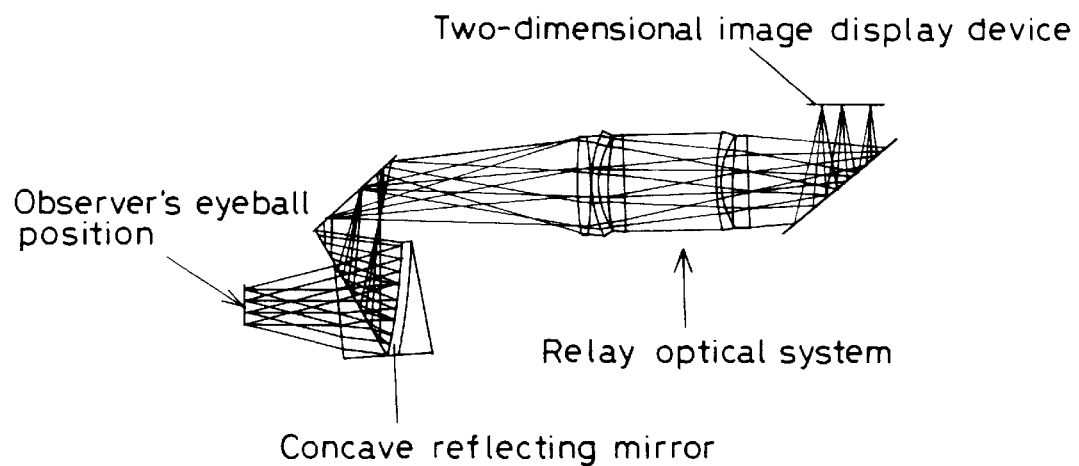
FIGS. 24(a) and 24(b) show an optical system of a conventional head-mounted image display apparatus.
Figure 24B:
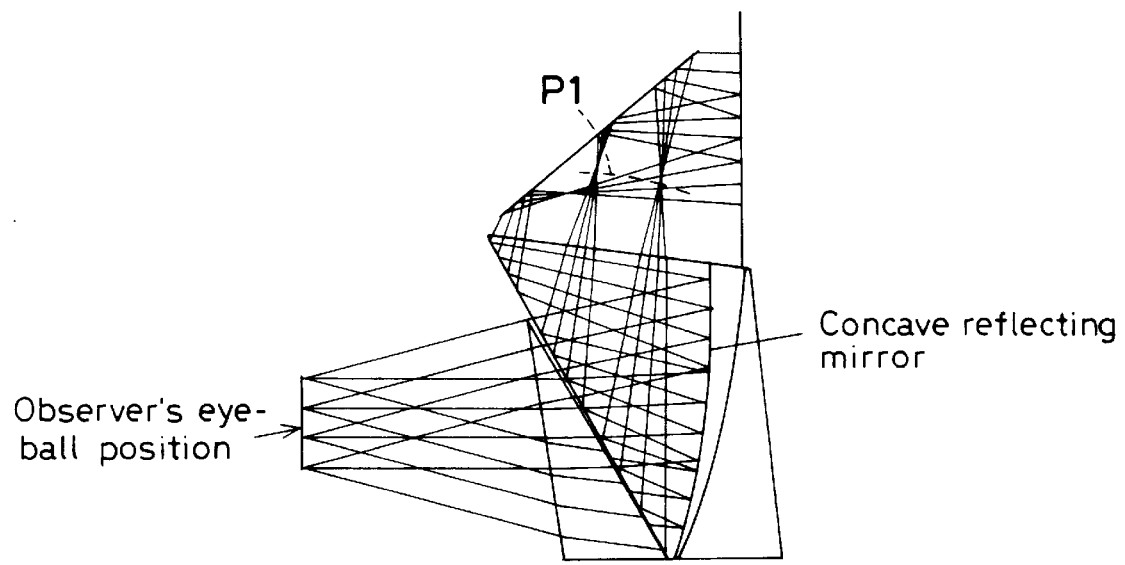
Figure 25:
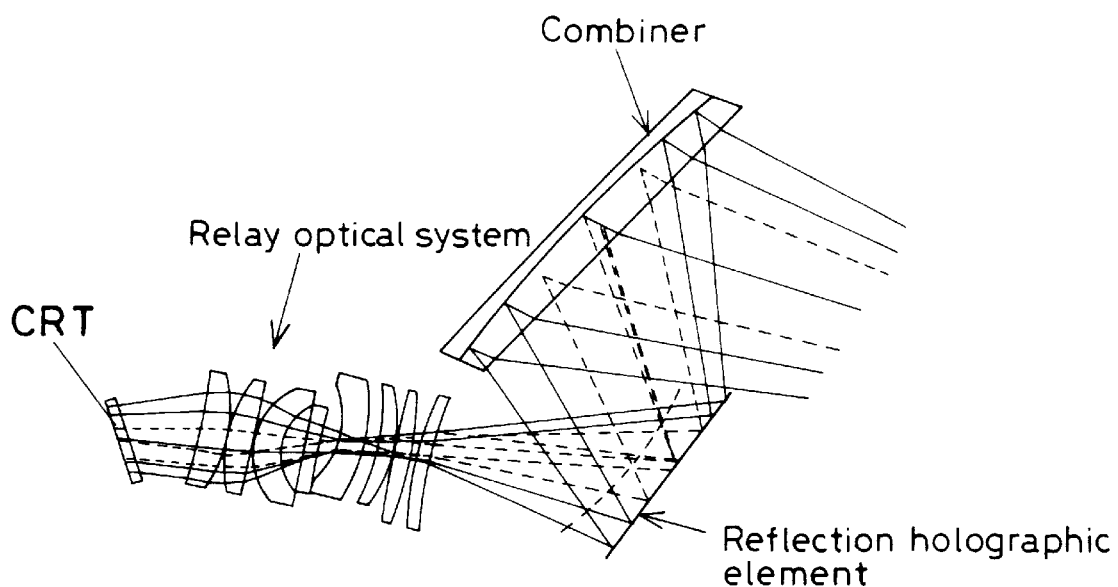
FIG. 25 shows an optical system of another conventional head-mounted image display apparatus.
Figure 28:
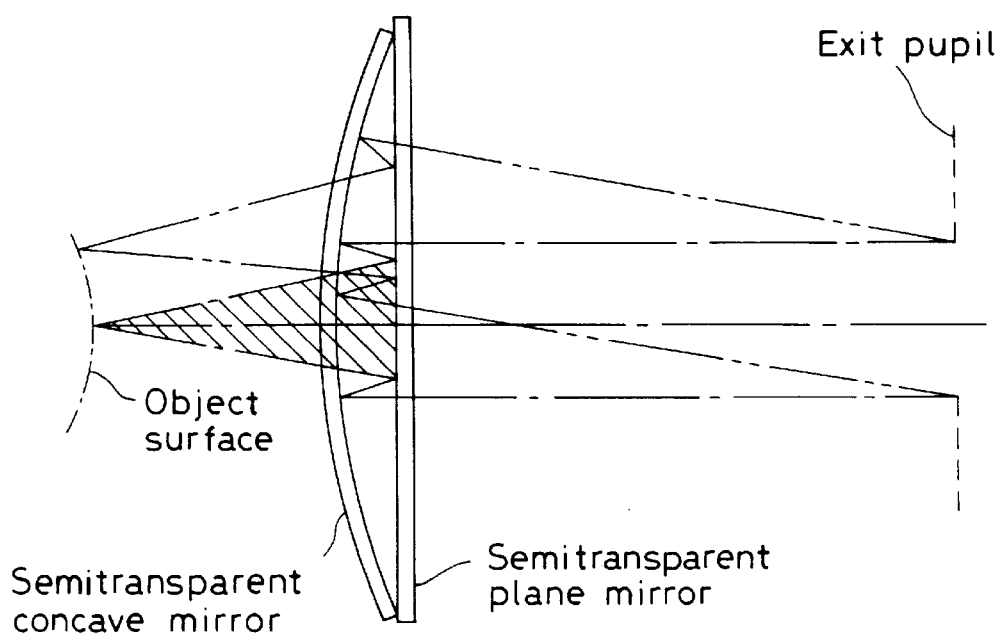
FIG. 28 shows an optical system of a still further conventional head-mounted image display apparatus.
Figures 26A, 27B:
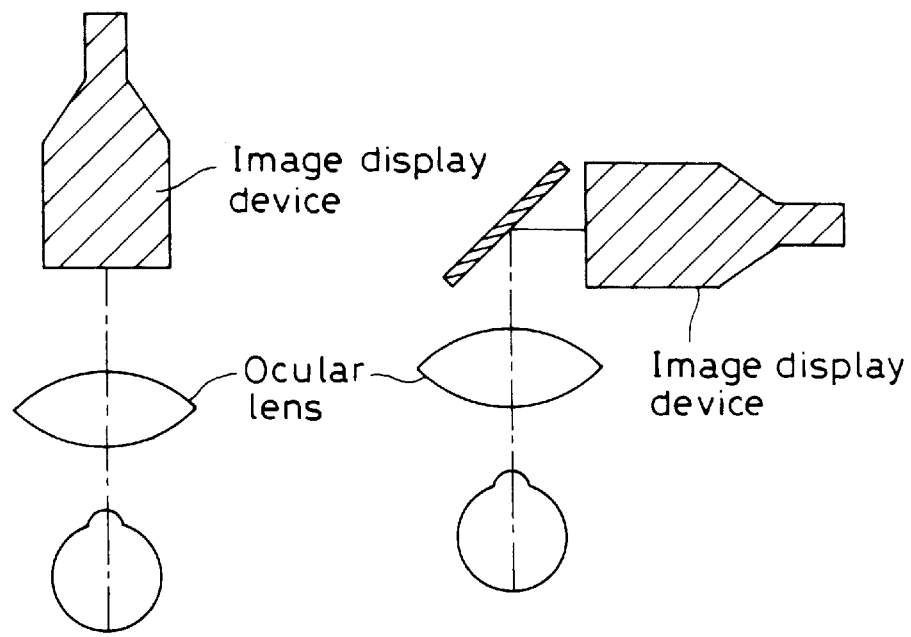
Figure 27:
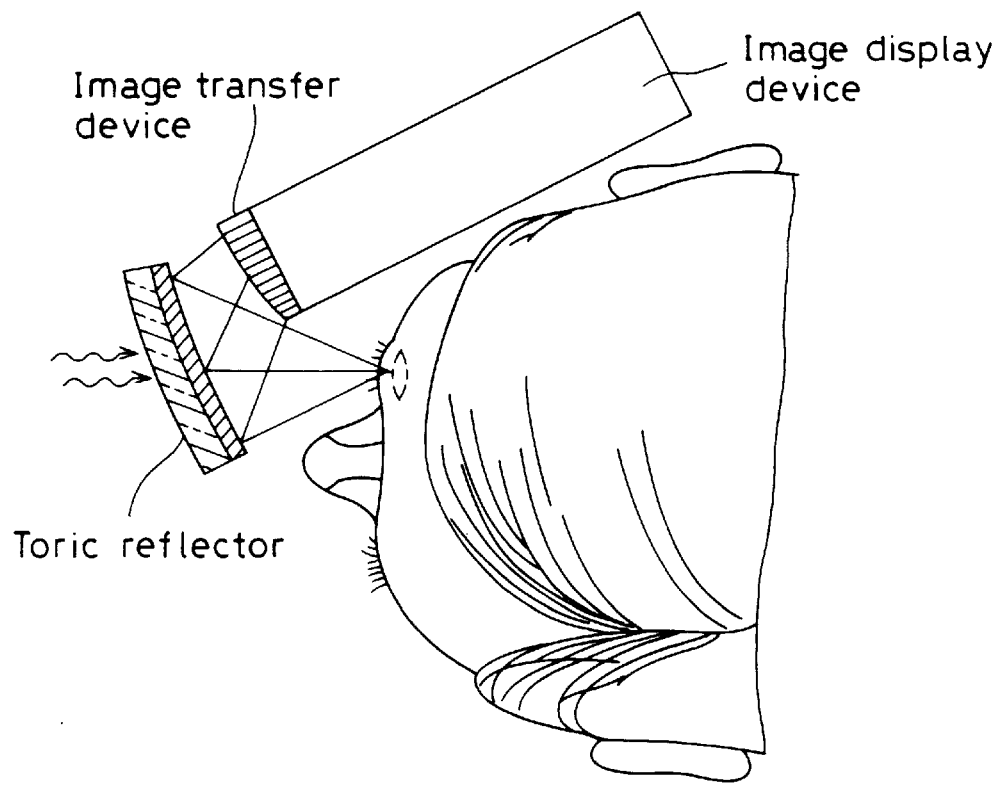
FIG. 27 shows an optical system of a further conventional head-mounted image display apparatus.

It should be noted that it is possible to form a portable image display apparatus, such as a stationary or head-mounted image display apparatus, which enables the observer to see with both eyes by preparing a pair of combinations of an ocular optical system according to the present invention, arranged as described above, and an image display device for the left and right eyes, and supporting them apart from each other by the distance between the eyes. FIG. 23 shows the whole arrangement of an example of such a portable image display apparatus. A display apparatus body unit 50 contains a pair of ocular optical systems (left and right) such as those described above, and image display devices comprising liquid crystal display devices are disposed at the respective image planes of the two ocular optical systems. The apparatus body unit 50 is provided with a pair of left and right temporal frames 51 which are contiguous with the left and right ends of the apparatus body unit 50, as illustrated in the figure. The two temporal frames 51 are connected by a top frame 52. In addition, a rear frame 54 is attached to the intermediate portion of each temporal frame 51 through a leaf spring 53. Thus, by applying the rear frames 54 to the rear portions of the observer's ears like the temples of a pair of glasses and placing the top frame 52 on the top of the observer's head, the display apparatus body unit 50 can be held in front of the observer's eyes. It should be noted that a top pad 55, which is an elastic material such as a sponge, is attached to the inner side of the top frame 52, and a similar pad is attached to the inner side of each rear frame 54, thereby allowing the user to wear the display apparatus on his or her head without feeling uncomfortable.

Further, a speaker 56 is provided on each rear frame 54 to enable the user to enjoy listening to stereophonic sound in addition to image observation. The display apparatus body unit 50 having the speakers 56 is connected with a reproducing unit 58, e.g. a portable video cassette unit, through an image and sound transmitting cord 57. Therefore, the user can enjoy not only observing an image but also listening to sound with the reproducing unit 58 retained on a desired position, e.g. a belt, as illustrated in the figure. Reference numeral 59 in the figure denotes a switch and volume control part of the reproducing unit 58. It should be noted that the top frame 52 contains electronic parts such as image and sound processing circuits.

The cord 57 may have a jack and plug arrangement attached to the distal end thereof so that the cord 57 can be detachably connected to an existing video deck. The cord 57 may also be connected to a TV signal receiving tuner so as to enable the user to enjoy watching TV. Alternatively, the cord 57 may be connected to a computer to receive computer graphic images or message images or the like from the computer. To eliminate the bothersome cord, the image display apparatus may be arranged to receive external radio signals through an antenna connected thereto.

As will be clear from the foregoing description, the present invention makes it possible to provide a head-mounted image display apparatus capable of providing an observation image which is clear and has minimal distortion even at a wide field angle.

What we claim is:

1. A head-mounted image display apparatus comprising:

an image display device; and an ocular optical system for leading an image formed by said image display device to an observer's eyeball position without forming an intermediate image so that said image is observed as a virtual image, said ocular optical system including at least one reflecting surface having reflecting action, said at least one reflecting surface having a surface configuration defined by a plane-symmetry free form surface in a three-dimensional space which is a rotationally asymmetric surface, and which has only one plane of symmetry, a Z-axis is taken in a direction of prolongation of a line segment along which an axial principal ray from a center of an image display area of said image display device emanates from said ocular optical system and reaches a center of said observer's eyeball position, a Y-axis is taken in a direction perpendicular to said Z-axis in a plane containing a folded line segment along which said axial principal ray is reflected by said reflecting surface, and an X-axis is taken in a direction perpendicular to both said Z- and Y-axes, and the following condition is satisfied:

$$0.14 < D^2Y10 < 5 \qquad (19\text{-}1)$$

where $D^2Y10$ denotes a value determined by dividing $D^2Y2$ at a final reflecting surface of said ocular optical system as viewed in sequence of backward ray tracing in which light rays are traced from a pupil of said observer's eyeball to said image display device by $D^2Y2$ at a first reflecting surface of said ocular optical system in the sequence of said backward ray tracing when an effective area is defined for each of said final and first reflecting surfaces as being an area formed by intersection of each reflecting surface and six principal rays, which are, with the Y-axis direction defined as a vertical direction, an axial principal ray in the Z-axis direction corresponding to a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of each reflecting surface is differentiated twice in the effective area with respect to the Y-axis, which corresponds to a decentering direction of said surface, thereby obtaining second-order differential values $D^2Y2$, $D^2Y1$, $D^2Y4$, $D^2Y5$, $D^2Y6$, and $D^2Y3$ at points where said six principal rays strike said surface, respectively.

2. A head-mounted image display apparatus comprising:

an image display device; and an ocular optical system for leading an image formed by said image display device to an observer's eyeball position without forming an intermediate image so that said image is observed as a virtual image, said ocular optical system including at least one reflecting surface having reflecting action, said at least one reflecting surface having a surface configuration defined by a plane-symmetry free form surface in a three-dimensional space which is a rotationally asymmetric surface, and which has only one plane of symmetry, a Z-axis is taken in a direction of prolongation of a line segment along which an axial principal ray from a center of an image display area of said image display device emanates from said ocular optical system and reaches a center of said observer's eyeball position, a Y-axis is taken in a direction perpendicular to said Z-axis in a plane containing a folded line segment along which said axial principal ray is reflected by said reflecting surface, an X-axis is taken in a direction perpendicular to both said Z- and Y-axes, and a final reflecting surface of said ocular optical system as viewed in sequence of backward ray tracing in which light rays are traced from a pupil of said observer's eyeball to said image display device satisfies the following condition:

$$0.55 < D^2XY11 < 4.0 \qquad (20\text{-}1)$$

where $D^2XY11$ denotes a value of $D^2X2/D^2Y2$ when an effective area is defined for said final reflecting surface as being an area formed by intersection of said final reflecting surface and six principal rays, which are, with the Y-axis direction defined as a vertical direction, an axial principal ray in the Z-axis direction corresponding to a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of said final reflecting surface is differentiated twice in the effective area with respect to the Y-axis, which corresponds to a decentering direction of said surface, thereby obtaining second-order differential values $D^2Y2$, $D^2Y1$, $D^2Y4$, $D^2Y5$, $D^2Y6$, and $D^2Y3$ at points where said six principal rays strike said surface, respectively, and further said equation is differentiated twice with respect to the X-axis, which corresponds to a direction perpendicular to said decentering direction, thereby obtaining second-order differential values $D^2X2$, $D^2X1$, $D^2X4$, $D^2X5$, $D^2X6$, and $D^2X3$ at the points where said six principal rays strike said surface, respectively.

3. A head-mounted image display apparatus comprising:

an image display device; and an ocular optical system for leading an image formed by said image display device to an observer's eyeball position without forming an intermediate image so that said image is observed as a virtual image, said ocular optical system including at least one reflecting surface having reflecting action, said at least one reflecting surface having a surface configuration defined by a plane-symmetry free form surface in a three-dimensional space which is a rotationally asymmetric surface, and which has only one plane of symmetry, and wherein a final reflecting surface of said ocular optical system as viewed in sequence of backward ray tracing in which light rays are traced from a pupil of said observer's eyeball to said image display device satisfies the following condition:

$$0.3 < CXY11 < 4.0 \qquad (32\text{-}1)$$

where CXY11 denotes a value of CX2/CY2 when an effective area is defined for said final reflecting surface as being an area formed by intersection of said final reflecting surface and six principal rays, which are, with the Y-axis direction defined as a vertical direction, an axial principal ray in the Z-axis direction corresponding to a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and curvatures in the X-axis direction, which corresponds to a direction perpendicular to a decentering direction of said final reflecting surface, are determined at points in said effective area at which said six principal rays strike said final reflecting surface from an equation which defines a configuration of said final reflecting surface as being CX2, CX1, CX4, CX5, CX6 and CX3, respectively, and further, curvatures at said points in the Y-axis direction, which corresponds to said decentering direction, are determined as being CY2, CY1, CY4, CY5, CY6 and CY3, respectively.

4. A head-mounted image display apparatus according to claim 1, 2 or 3 wherein a Z-axis is taken in a direction of prolongation of a line segment along which an axial principal ray from a center of an image display area of said image display device emanates from said ocular optical system and reaches a center of said observer's eyeball positions, a Y-axis is taken in a direction perpendicular to said Z-axis in a plane containing a folded line segment along which said axial principal ray is reflected by said reflecting surface, and an X-axis is taken in a direction perpendicular to both said Z- and Y-axes, the plane of symmetry of said plane-symmetry three-dimensional surface lies in either a YZ-plane or a plane parallel to the YZ-plane.

5. A head-mounted image display apparatus according to claim 4, wherein at least one of a reflective refracting power of said axial principal ray reflecting region of said reflecting surface in the YZ-plane and a reflective refracting power of said axial principal ray reflecting region in a plane perpendicular to the YZ-plane is positive.

6. A head-mounted image display apparatus according to claim 4, wherein both a reflective refracting power of said axial principal ray reflecting region of said reflecting surface in the YZ-plane and a reflective refracting power of said axial principal ray reflecting region in a plane perpendicular to the YZ-plane are positive.

7. A head-mounted image display apparatus according to claim 1, 2, or 3, wherein a Z-axis is taken in a direction of prolongation of a line segment along which an axial principal ray from a center of an image display area of said image display device emanates from said ocular optical system and reaches a center of said observer's eyeball position, a Y-axis is taken in a direction perpendicular to said Z-axis in a plane containing a folded line segment along which said axial principal ray is reflected by said reflecting surface, an X-axis is taken in a direction perpendicular to both said Z- and Y-axes, and the following condition is satisfied:

$$-0.05 < D^2XY_{max1} < 0.01 \qquad (8\text{-}3)$$

where $D^2XY_{max1}$ denotes a maximum value of absolute values of $D^2XY$ at all reflecting surfaces of said ocular optical system when an effective area is defined for each of said reflecting surfaces as being an area formed by intersection of each reflecting surface and six principal rays, which are, with the Y-axis direction defined as a vertical direction, an axial principal ray in the Z-axis direction corresponding to a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of each reflecting surface is differentiated twice in the effective area with respect to the Y-axis, which corresponds to a decentering direction of said surface, thereby obtaining second-order differential values $D^2Y2$, $D^2Y1$, $D^2Y4$, $D^2Y5$, $D^2Y6$, and $D^2Y3$ at points where said six principal rays strike said surface, respectively, and further said equation is differentiated twice with respect to the X-axis, which corresponds to a direction perpendicular to said decentering direction, thereby obtaining second-order differential values $D^2X2$, $D^2X1$, $D^2X4$, $D^2X5$, $D^2X6$, and $D^2X3$ at the points where said six principal rays strike said surface, respectively, and $D^2X2$–$D^2Y2$ is denoted by $D^2XY$.

8. A head-mounted image display apparatus according to claim 1, 2 or 3 wherein:

a Z-axis is taken in a direction of prolongation of a line segment along which an axial principal ray from a center of an image display area of said image display device emanates from said ocular optical system and reaches a center of said observer's eyeball position, a Y-axis is taken in a direction perpendicular to said Z-axis in a plane containing a folded line segment along which said axial principal ray is reflected by said reflecting surface, an X-axis is taken in a direction perpendicular to both said Z- and Y-axes, and a first reflecting surface of said ocular optical system as viewed in sequence of backward ray tracing in which light rays are traced from a pupil of said observer's eyeball to said image display device satisfies the following condition:

$$-0.02 < D^2X_{max2} < -0.005 \quad (11\text{-}3)$$

where $D^2X_{max2}$ denotes all values of $D^2X1$, $D^2X2$, $D^2X3$, $D^2X4$, $D^2X5$, and $D^2X6$ when an effective area is defined for said first reflecting surface as being an area formed by intersection of said first reflecting surface and six principal rays, which are, with the Y-axis direction defined as a vertical direction, an axial principal ray in the Z-axis direction corresponding to a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of said first reflecting surface is differentiated twice in the effective area with respect to the X-axis, which corresponds to a direction perpendicular to a decentering direction of said surface, thereby obtaining second-order differential values $D^2X2$, $D^2X1$, $D^2X4$, $D^2X5$, $D^2X6$, and $D^2X3$ at points where said six principal rays strike said surface, respectively.

9. A head-mounted image display apparatus according to claim 1, 2 or 3, wherein a Z-axis is taken in a direction of prolongation of a line segment along which an axial principal ray from a center of an image display area of said image display device emanates from said ocular optical system and reaches a center of said observer's eyeball position, a Y-axis is taken in a direction perpendicular to said Z-axis in a plane containing a folded line segment along which said axial principal ray is reflected by said reflecting surface, an X-axis is taken in a direction perpendicular to both said Z- and Y-axes, and the following condition is satisfied:

$$-0.005 < D^2X_{max5} < 0.005 \quad (14\text{-}5)$$

where $D^2X_{max5}$ denotes values $D^2X1 - D^2X3$ and $D^2X4 - D^2X6$ at all reflecting surfaces of said ocular optical system when an effective area is defined for each of said reflecting surfaces as being an area formed by intersection of each reflecting surface and six principal rays, which are, with the Y-axis direction defined as a vertical direction, an axial principal ray in the Z-axis direction corresponding to a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of each reflecting surface is differentiated twice in the effective area with respect to the X-axis, which corresponds to a direction perpendicular to a decentering direction of said surface, thereby obtaining second-order differential values $D^2X2$, $D^2X1$, $D^2X4$, $D^2X5$, $D^2X6$, and $D^2X3$ at points where said six principal rays strikes said surface, respectively.

10. A head-mounted image display apparatus according to claim 1, 2 or 3 wherein:

a Z-axis is taken in a direction of prolongation of a line segment along which an axial principal ray from a center of an image display area of said image display device emanates from said ocular optical system and reaches a center of said observer's eyeball position, a Y-axis is taken in a direction perpendicular to said Z-axis in a plane containing a folded line segment along which sa id axial principal ray is reflected by said reflecting surface, an X-axis is taken in a direction perpendicular to both said Z- and Y-axes, and the following condition is satisfied:

$$-0.01 < D^2XY_{max7} < 0.01 \quad (16\text{-}4)$$

where $D^2XY_{max7}$ denotes all values of $D^2Xn-D^2Yn$ (n is 1 to 6) at all reflecting surfaces of said ocular optical system when an effective area is defined for each of said reflecting surfaces as being an area formed by intersection of each reflecting surface and six principal rays, which are, with the Y-axis direction defined as a vertical direction, an axial principal ray in the Z-axis direction corresponding to a center of an image field, a principal ray in a field angle direction corresponding to a center of an upper edge of the image field, a principal ray in a field angle direction corresponding to an upper-right corner of the image field, a principal ray in a field angle direction corresponding to a center of a right-hand edge of the image field, a principal ray in a field angle direction corresponding to a lower-right corner of the image field, and a principal ray in a field angle direction corresponding to a center of a lower edge of the image field, and an equation which defines a configuration of each reflecting surface is differentiated twice in the effective area with respect to the Y-axis, which corresponds to a Decentering direction of said surface, thereby obtaining second-order differential values $D^2Y2$, $D^2Y1$, $D^2Y4$, $D^2Y5$, $D^2Y6$, and $D^2Y3$ at points where said six principal rays strike said surface, respectively, and further said equation is differentiated twice with respect to the X-axis, which corresponds to a direction perpendicular to said decentering direction, thereby obtaining second-order differential values $D^2X2$, $D^2X1$, $D^2X4$, $D^2X5$, $D^2X6$, and $D^2X3$ at the points where said six principal rays strike said surface, respectively.

11. A head-mounted image display apparatus according to claim 1, 2 or 3, wherein said reflecting surface is formed by a back-coated reflecting mirror having a medium with a refractive index (n) larger than 1 (n>1).

12. A head-mounted image display apparatus according to claim 11, wherein said ocular optical system includes at least three surfaces, which are a first surface, a second surface, and a third surface at least one of said three surfaces being formed by said back-coated reflecting mirror.

13. A head-mounted image display apparatus according to claim 12, wherein said ocular optical system includes a prism member having at least a third surface facing said image display devices a first surface facing said observer's eyeball positions and a second surface facing both said first surface and said third surface across a medium having a refractive index (n) larger than 1 (n>1), said second surface being formed by said reflecting surface.

14. A head-mounted image display apparatus according to claim 13, wherein said ocular optical system includes a prism member having at least a third surface facing said image display device, a first surface facing said observer's eyeball position, and a second surface facing both said first surface and said third surface across a medium having a refractive index (n) larger than 1 (n>1), said prism member being arranged such that an axial principal ray emanating from said image display device is reflected by at least said first surface, and then reflected by said second surface, and the reflected ray finally passes through said first surface to exit from said prism member, at least a region of said first surface which has reflecting action being formed by said plane-symmetry three-dimensional surface.

15. A head-mounted image display apparatus according to claim 14, wherein said prism member is arranged and said image display device is disposed such that reflection at said first surface is total reflection with respect to at least the axial principal ray.

16. A head-mounted image display apparatus according to claim 15, wherein said first surface and said second surface have respective concave surfaces directed toward said observer's eyeball position.

17. A head-mounted image display apparatus according to claim 14, wherein said first surface and said second surface have respective concave surfaces directed toward said observer's eyeball position.

18. A head-mounted image display apparatus according to claim 14, wherein said first surface and said third surface are each formed from a plane-symmetry free form surface each having only one plane of symmetry.

19. A head-mounted image display apparatus according to claim 18, wherein the only one plane of symmetry of the plane-symmetry free form surface that forms said first surface and the only one plane of symmetry of the plane-symmetry free form surface that forms said third surface are the same plane.

20. A head-mounted image display apparatus according to claim 14, wherein said first surface and said second surface are each formed from a plane-symmetry free form surface which has only one plane of symmetry.

21. A head-mounted image display apparatus according to claim 20, wherein the only one plane of symmetry of the plane-symmetry free form surface that forms said first surface and the only one plane of symmetry of the plane-symmetry free form surface that forms said second surface are the same plane.

22. A head-mounted image display apparatus according to claim 14, wherein said first surface, said second surface and said third surface are each formed from a plane-symmetry free form surface each having only one plane of symmetry.

23. A head-mounted image display apparatus according to claim 22, wherein the only one plane of symmetry of the plane-symmetry free form surface that forms said first surface and the only one plane of symmetry of the plane-symmetry free form surface that forms said second surface and further the only one plane of symmetry of the plane-symmetry free form surface that forms said third surface are the same plane.

24. A head-mounted image display apparatus according to claim 13, wherein said first surface and said second surface have respective concave surfaces directed toward said observer's eyeball position.

25. A head-mounted image display apparatus according to claim 13, wherein said first surface has a rotationally symmetric spherical surface configuration.

26. A head-mounted image display apparatus according to claim 25, wherein said second surface has a concave surface directed toward said observer's eyeball position.

27. A head-mounted image display apparatus according to claim 13, wherein said first surface has a plane surface configuration.

28. A head-mounted image display apparatus according to claim 27, wherein said second surface has a concave surface directed toward said observer's eyeball position.

29. A head-mounted image display apparatus according to claim 13 wherein said prism member includes a third surface facing said image display device, a fourth surface which reflects an axial principal ray entering said prism member through said third surface toward said observer's eyeball position, a first surface which reflects the axial principal ray reflected by said fourth surface away from said observer's eyeball position and a second surface which reflects the axial principal ray reflected by said first surface toward said observer's eyeball position.

* * * * *